US012076208B2

(12) United States Patent
Sato et al.

(10) Patent No.: US 12,076,208 B2

(45) Date of Patent: Sep. 3, 2024

(54) DIRECT FABRICATION OF MIXED METAL AND POLYMER ORTHODONTIC DEVICES

(71) Applicant: ALIGN TECHNOLOGY, INC., San Jose, CA (US)

(72) Inventors: Jun Sato, San Jose, CA (US); Yuxiang Wang, Newark, CA (US)

(73) Assignee: ALIGN TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/444,121

(22) Filed: Jul. 30, 2021

(65) Prior Publication Data

US 2022/0031426 A1 Feb. 3, 2022

Related U.S. Application Data

(60) Provisional application No. 63/059,790, filed on Jul. 31, 2020.

(51) Int. Cl.

*A61C 7/08* (2006.01)

*A61C 7/00* (2006.01)

(52) U.S. Cl.

CPC ................ *A61C 7/08* (2013.01); *A61C 7/002* (2013.01)

(58) Field of Classification Search

CPC .. A61C 7/08; A61C 7/002; A61C 7/10; B33Y 50/00; B33Y 70/10; B33Y 80/00

See application file for complete search history.

(56) References Cited

U.S. PATENT DOCUMENTS 5,820,368 A 10/1998 Wolk
5,975,893 A 11/1999 Chishti et al.
6,183,248 B1 2/2001 Chishti et al.
6,309,215 B1 * 10/2001 Phan ........................ A61C 9/00 433/24
6,386,864 B1 5/2002 Kuo
6,450,807 B1 9/2002 Chishti et al.
6,454,565 B2 9/2002 Phan et al.
6,471,511 B1 10/2002 Chishti et al.
6,524,101 B1 2/2003 Phan et al.
6,572,372 B1 6/2003 Phan et al.
6,607,382 B1 8/2003 Kuo et al.
6,705,863 B2 3/2004 Phan et al.
6,749,414 B1 6/2004 Hanson et al.
6,783,604 B2 8/2004 Tricca
6,790,035 B2 9/2004 Tricca et al.
6,814,574 B2 11/2004 Abolfathi et al.
6,830,450 B2 * 12/2004 Knopp .................... B29C 43/56 433/18

(Continued)

FOREIGN PATENT DOCUMENTS

WO WO-2006096558 A2 * 9/2006 ............... A61C 7/00
WO WO-2017007964 A1 * 1/2017 ............ A61C 7/002

*Primary Examiner* — Heidi M Eide

*Assistant Examiner* — Lina Faraj

(74) *Attorney, Agent, or Firm* — FisherBroyles, LLP

(57) ABSTRACT

The disclosed systems, methods, and apparatus for designing, fabricating, and making directly fabricated metal and polymer dental appliances may include receiving patient data and a treatment plan and determining, using the patient data and the treatment plan, an appliance design for treating the patient. The method may include directly fabricating a metal and polymer appliance based on the appliance design. The apparatus may include a directly fabricated metal and polymer appliance.

12 Claims, 15 Drawing Sheets

(56) References Cited

U.S. PATENT DOCUMENTS 6,947,038 B1 9/2005 Anh et al.
7,074,039 B2 7/2006 Kopelman et al.
7,104,792 B2 9/2006 Taub et al.
7,121,825 B2 10/2006 Chishti et al.
7,160,107 B2 1/2007 Kopelman et al.
7,192,273 B2 3/2007 McSurdy, Jr.
7,347,688 B2 3/2008 Kopelman et al.
7,354,270 B2 4/2008 Abolfathi et al.
7,448,514 B2 11/2008 Wen
7,481,121 B1 1/2009 Cao
7,543,511 B2 6/2009 Kimura et al.
7,553,157 B2 6/2009 Abolfathi et al.
7,600,999 B2 10/2009 Knopp
7,658,610 B2 2/2010 Knopp
7,766,658 B2 8/2010 Tricca et al.
7,771,195 B2 8/2010 Knopp et al.
7,854,609 B2 12/2010 Chen et al.
7,871,269 B2 1/2011 Wu et al.
7,878,801 B2 2/2011 Abolfathi et al.
7,878,805 B2 2/2011 Moss et al.
7,883,334 B2 2/2011 Li et al.
7,892,474 B2 2/2011 Shkolnik et al.
7,914,283 B2 3/2011 Kuo
7,947,508 B2 5/2011 Tricca et al.
8,152,518 B2 4/2012 Kuo
8,172,569 B2 5/2012 Matty et al.
8,235,715 B2 8/2012 Kuo
8,292,617 B2 10/2012 Brandt et al.
8,337,199 B2 12/2012 Wen
8,401,686 B2 3/2013 Moss et al.
8,517,726 B2 8/2013 Kakavand et al.
8,562,337 B2 10/2013 Kuo et al.
8,641,414 B2 2/2014 Borovinskih et al.
8,684,729 B2 4/2014 Wen
8,708,697 B2 4/2014 Li et al.
8,758,009 B2 6/2014 Chen et al.
8,771,149 B2 7/2014 Rahman et al.
8,899,976 B2 12/2014 Chen et al.
8,899,977 B2 12/2014 Cao et al.
8,936,463 B2 1/2015 Mason et al.
8,936,464 B2 1/2015 Kopelman
9,022,781 B2 5/2015 Kuo et al.
9,119,691 B2 9/2015 Namiranian et al.
9,161,823 B2 10/2015 Morton et al.
9,241,774 B2 1/2016 Li et al.
9,326,831 B2 5/2016 Cheang
9,433,476 B2 9/2016 Khardekar et al.
9,610,141 B2 4/2017 Kopelman et al.
9,655,691 B2 5/2017 Li et al.
9,675,427 B2 6/2017 Kopelman
9,700,385 B2 7/2017 Webber
9,744,001 B2 8/2017 Choi et al.
9,844,424 B2 12/2017 Wu et al.
10,045,835 B2 8/2018 Boronkay et al.
10,111,730 B2 10/2018 Webber et al.
10,150,244 B2 12/2018 Sato et al.
10,201,409 B2 2/2019 Mason et al.
10,213,277 B2 2/2019 Webber et al.
10,299,894 B2 5/2019 Tanugula et al.
10,335,250 B2 * 7/2019 Wen ..................... A61C 7/08
10,363,116 B2 7/2019 Boronkay
10,383,705 B2 8/2019 Shanjani et al.
D865,180 S 10/2019 Bauer et al.
10,449,016 B2 10/2019 Kimura et al.
10,463,452 B2 11/2019 Matov et al.
10,470,847 B2 11/2019 Shanjani et al.
10,492,888 B2 12/2019 Chen et al.
10,517,701 B2 12/2019 Boronkay
10,537,406 B2 1/2020 Wu et al.
10,537,463 B2 1/2020 Kopelman
10,548,700 B2 2/2020 Fernie
10,555,792 B2 2/2020 Kopelman et al.
10,588,776 B2 3/2020 Cam et al.
10,613,515 B2 4/2020 Cramer et al.
10,639,134 B2 5/2020 Shanjani et al.
10,743,964 B2 8/2020 Wu et al.
10,758,323 B2 9/2020 Kopelman
10,781,274 B2 9/2020 Liska et al.
10,813,720 B2 10/2020 Grove et al.
10,874,483 B2 12/2020 Boronkay
10,881,487 B2 1/2021 Cam et al.
10,912,629 B2 2/2021 Tanugula et al.
10,959,810 B2 3/2021 Li et al.
10,993,783 B2 5/2021 Wu et al.
11,026,768 B2 6/2021 Moss et al.
11,026,831 B2 6/2021 Kuo
11,045,282 B2 6/2021 Kopelman et al.
11,045,283 B2 6/2021 Riley et al.
11,103,330 B2 8/2021 Webber et al.
11,123,156 B2 9/2021 Cam et al.
11,154,382 B2 10/2021 Kopelman et al.
11,166,788 B2 11/2021 Webber
2001/0041320 A1 * 11/2001 Phan ..................... A61C 19/00 433/24
2002/0192617 A1 12/2002 Phan et al.
2003/0224312 A1 * 12/2003 Bergersen ............. A61C 7/002 433/6
2004/0009449 A1 1/2004 Mah et al.
2004/0166462 A1 8/2004 Phan et al.
2004/0166463 A1 8/2004 Wen et al.
2005/0014105 A1 1/2005 Abolfathi et al.
2005/0186524 A1 8/2005 Abolfathi et al.
2005/0244768 A1 11/2005 Taub et al.
2006/0019218 A1 1/2006 Kuo
2006/0078841 A1 4/2006 Desimone et al.
2006/0099546 A1 * 5/2006 Bergersen ............... A61C 7/36 433/6
2006/0115782 A1 6/2006 Li et al.
2006/0115785 A1 * 6/2006 Li ......................... A61P 29/00 433/80
2006/0199142 A1 9/2006 Liu et al.
2006/0234179 A1 10/2006 Wen et al.
2008/0118882 A1 5/2008 Su
2008/0160473 A1 7/2008 Li et al.
2008/0286716 A1 11/2008 Sherwood
2008/0286717 A1 11/2008 Sherwood
2008/0299507 A1 * 12/2008 Li ......................... A61C 7/08 433/24
2009/0280450 A1 11/2009 Kuo
2010/0055635 A1 3/2010 Kakavand
2010/0129763 A1 5/2010 Kuo
2011/0269092 A1 11/2011 Kuo et al.
2013/0095446 A1 * 4/2013 Andreiko .............. A61C 7/002 128/848
2014/0061974 A1 3/2014 Tyler
2014/0067334 A1 3/2014 Kuo
2014/0120490 A1 * 5/2014 Borovinskih ........... A61C 7/36 433/24
2014/0265034 A1 9/2014 Dudley
2015/0097315 A1 4/2015 DeSimone et al.
2015/0097316 A1 4/2015 DeSimone et al.
2015/0102532 A1 4/2015 DeSimone et al.
2015/0265376 A1 9/2015 Kopelman
2015/0366638 A1 12/2015 Kopelman et al.
2016/0074137 A1 * 3/2016 Kuo ..................... B33Y 50/02 703/11
2016/0081769 A1 * 3/2016 Kimura ................. A61C 7/002 433/7
2016/0193014 A1 7/2016 Morton et al.
2016/0228286 A1 * 8/2016 Rayek ..................... A61C 7/08
2016/0242870 A1 8/2016 Matov et al.
2016/0242871 A1 8/2016 Morton et al.
2016/0310236 A1 * 10/2016 Kopelman ............... A61C 7/14
2017/0007359 A1 1/2017 Kopelman et al.
2017/0007360 A1 * 1/2017 Kopelman ............. B33Y 80/00
2017/0007361 A1 1/2017 Boronkay et al.
2017/0007366 A1 1/2017 Kopelman et al.
2017/0007367 A1 * 1/2017 Li ......................... A61C 7/002
2017/0007386 A1 1/2017 Mason et al.
2017/0135792 A1 5/2017 Webber
2017/0135793 A1 5/2017 Webber et al.
2017/0156821 A1 * 6/2017 Kopelman ............... A61C 7/10
2017/0165032 A1 6/2017 Webber et al.

(56) References Cited

U.S. PATENT DOCUMENTS

2018/0021107 A1* 1/2018 Benarouch ............. A61C 7/002 433/6
2018/0049846 A1* 2/2018 Martz ...................... A61C 7/08
2018/0153648 A1 6/2018 Shanjani et al.
2018/0360567 A1 12/2018 Xue et al.
2018/0368944 A1 12/2018 Sato et al.
2019/0000592 A1 1/2019 Cam et al.
2019/0000593 A1 1/2019 Cam et al.
2019/0021817 A1 1/2019 Sato et al.
2019/0029775 A1 1/2019 Morton et al.
2019/0046297 A1 2/2019 Kopelman et al.
2019/0099129 A1 4/2019 Kopelman et al.
2019/0125494 A1 5/2019 Li et al.
2019/0125497 A1 5/2019 Derakhshan et al.
2019/0152152 A1 5/2019 O'Leary et al.
2019/0175304 A1 6/2019 Morton et al.
2019/0231477 A1 8/2019 Shanjani et al.
2019/0262101 A1 8/2019 Shanjani et al.
2019/0298494 A1 10/2019 Webber et al.
2019/0314119 A1 10/2019 Kopelman et al.
2019/0338067 A1 11/2019 Liska et al.
2019/0343606 A1 11/2019 Wu et al.
2020/0000553 A1 1/2020 Makarenkova et al.
2020/0055252 A1* 2/2020 Lewicki .................. G06F 30/20
2020/0086553 A1 3/2020 Mojdeh et al.
2020/0100864 A1 4/2020 Wang et al.
2020/0100865 A1 4/2020 Wang et al.
2020/0100866 A1 4/2020 Medvinskaya et al.
2020/0100871 A1 4/2020 Wang et al.
2020/0155276 A1 5/2020 Cam et al.
2020/0188062 A1 6/2020 Kopelman et al.
2020/0205936 A1* 7/2020 Wen ......................... A61C 7/08
2020/0214598 A1 7/2020 Li et al.
2020/0214801 A1 7/2020 Wang et al.
2020/0390523 A1 12/2020 Sato et al.
2020/0397537 A1* 12/2020 Raby ........................ A61C 7/08
2021/0078357 A1 3/2021 Venkatasanthanam et al.
2021/0147672 A1 5/2021 Cole et al.
2022/0001627 A1* 1/2022 Mathea ................... B29C 64/40

* cited by examiner

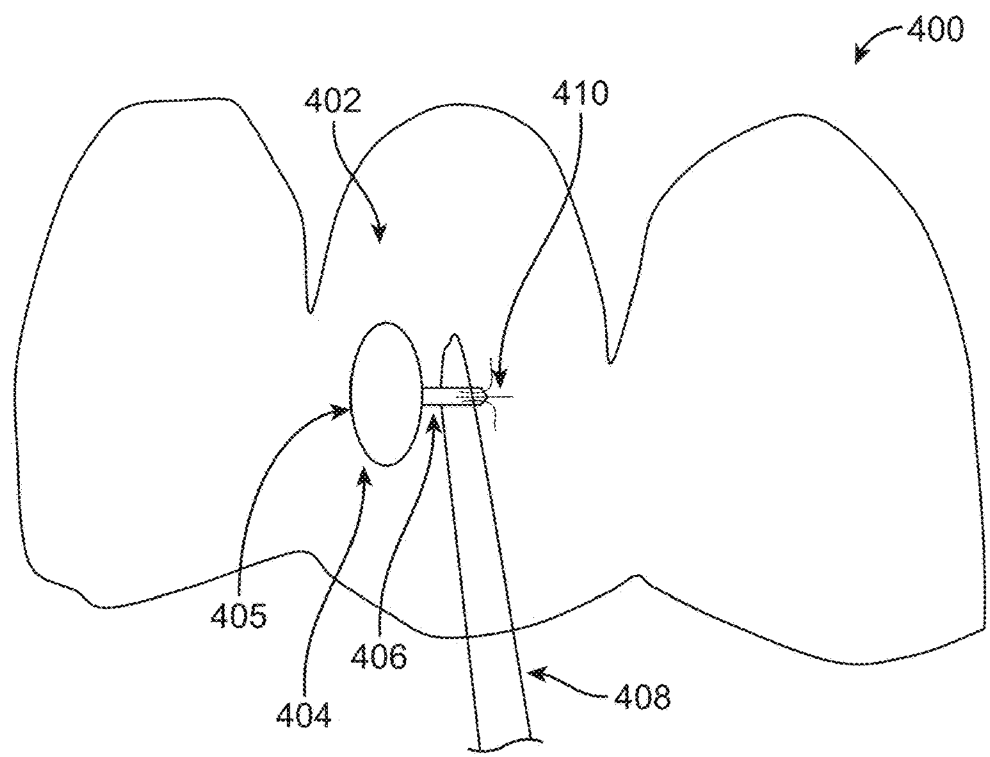
FIG. 4A
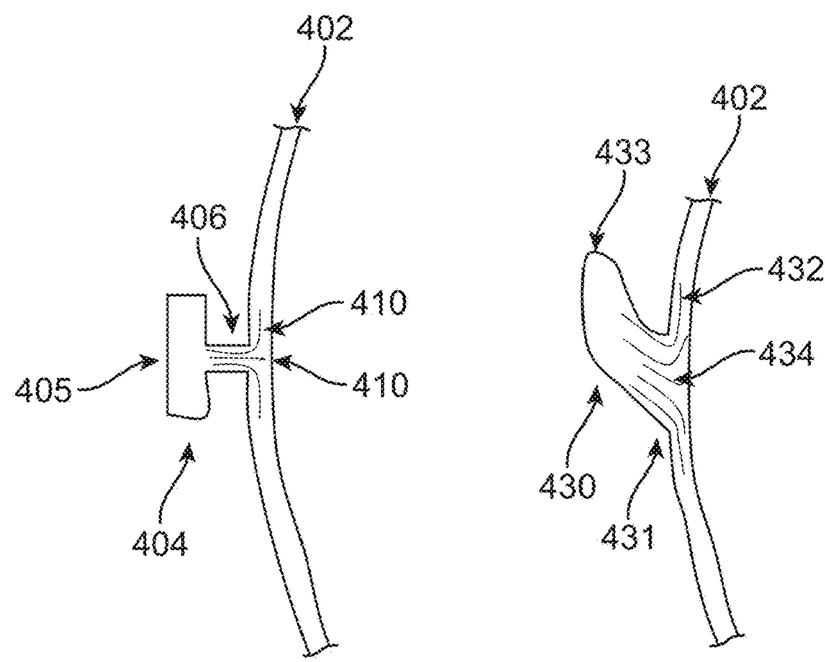
FIG. 4B
FIG. 4C

DIRECT FABRICATION OF MIXED METAL AND POLYMER ORTHODONTIC DEVICES

RELATED APPLICATIONS

This application claims the benefit under 35 U.S.C. § 119(e) of U.S. Provisional Patent Application No. 63/059,790, filed Jul. 31, 2020, and titled "DIRECT FABRICATION OF MIXED METAL AND POLYMER ORTHODONTIC DEVICES," which is incorporated, in its entirety, by this reference.

BACKGROUND

Orthodontic treatment using orthodontic appliances comprising only metal or only polymers leads to less than desirable orthodontic treatment. For example, polymer based orthodontic aligners may be less rigid and desirable than desired. For example, a polymeric orthodontic aligner may be ill suited for use when a patient has one or more missing teeth because transferring force across the gap formed by the missing tooth using polymer material may result in buckling or deformation. Similarly, polymer materials used in the humid and hot environment of the mouth may weaken over time. Metal orthodontic devices are rigid, but lack the workability and customization of polymer based orthodontic devices. Metal and polymeric appliances provide improved characteristics, but are less than desirable in at least some respects. For example, metal and polymeric appliances are cumbersome and difficult to fabricate based on available manual and separate techniques wherein metal and polymeric portions of appliances are separately fabricated.

Work in relation to the present disclosure has shown that direct fabrication of aligners with mixed materials such as a combination of polymer and metal materials allows for new and unique benefits not otherwise possible when using one or the other material.

SUMMARY

As will be described in greater detail below, the present disclosure describes various systems and methods for using mechanical simulations to improve treatment planning and orthodontic appliance design.

In addition, the systems and methods described herein may improve the functioning of a computing device by reducing computing resources and overhead for simulating treatment results, thereby improving processing efficiency of the computing device over conventional approaches. These systems and methods may also improve the field of orthodontic treatment by providing orthodontic appliances with greater strength, durability, and ease of use.

INCORPORATION BY REFERENCE

All patents, applications, and publications referred to and identified herein are hereby incorporated by reference in their entirety, and shall be considered fully incorporated by reference even though referred to elsewhere in the application.

BRIEF DESCRIPTION OF THE DRAWINGS

A better understanding of the features, advantages and principles of the present disclosure will be obtained by reference to the following detailed description that sets forth illustrative embodiments, and the accompanying drawings of which:

FIGS. 4A, 4B, and 4C shows examples of metal reinforced polymeric hooks and buttons, in accordance with some embodiments.

DETAILED DESCRIPTION

Figure 1A:
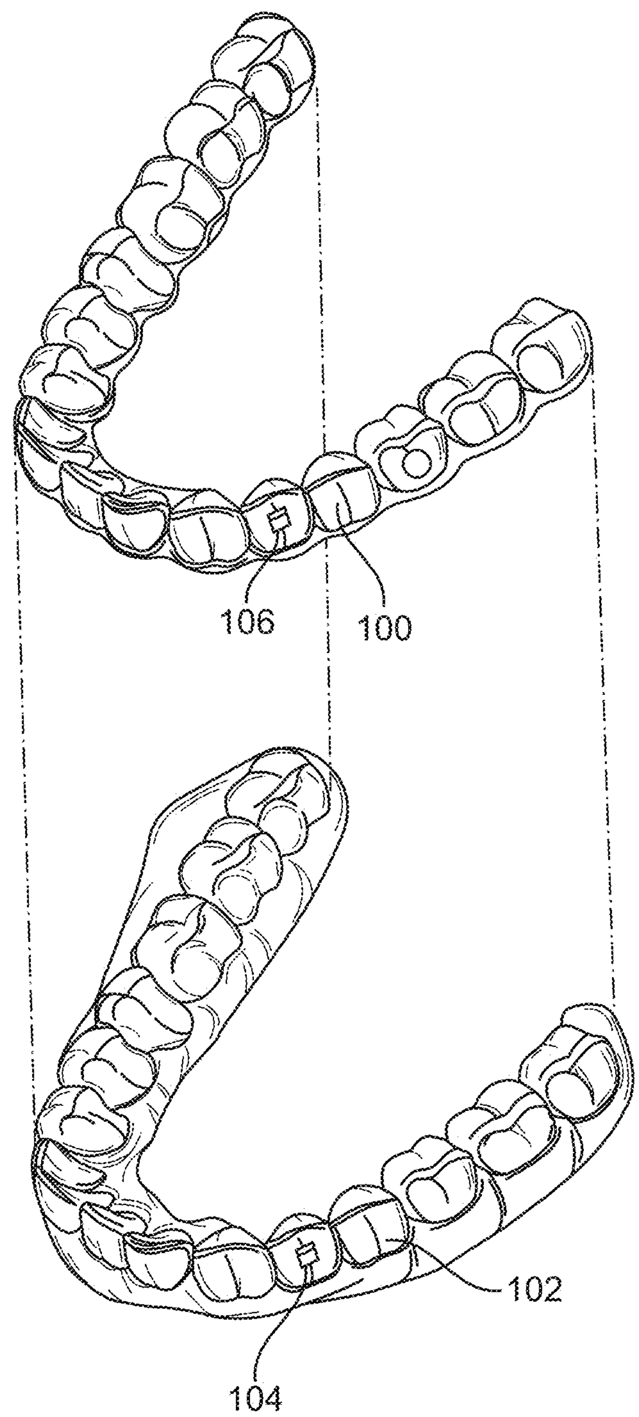
FIG. 1A shows a tooth repositioning appliance, in accordance with some embodiments.

The following detailed description and provides a better understanding of the features and advantages of the inventions described in the present disclosure in accordance with the embodiments disclosed herein. Although the detailed description includes many specific embodiments, these are provided by way of example only and should not be construed as limiting the scope of the inventions disclosed herein.

The methods, apparatus and dental appliances disclosed herein are well suited for combination with many dental appliances and applications, such as an aligner for aligning a plurality of teeth, a retainer, a palatal expander, a bracket for placing attachments on a plurality of teeth, an attachment for coupling to teeth, a nightguard, a functional appliance, and a directly fabricated aligner thermoforming mold. The presently disclosed methods, apparatus and appliances are well suited for direct fabrication with deposition manufacturing, sometimes referred to as additive manufacturing or 3D printing, fused deposition modeling, stereo lithography (SLA), digital light projector (DLP) printing, continuous DLP, inkjet spray, and metal printing. Also, the presently disclosed methods and apparatus are well suited for the additive manufacturing of different materials onto a single appliance, such as inkjet printing with a plurality of different materials to fabricate an appliance comprising a plurality of different materials.

In some embodiments, the orthodontic appliances herein (or portions thereof) can be produced using direct fabrication, such as additive manufacturing techniques (also referred to herein as “3D printing”). Additive manufacturing techniques can be categorized as follows: (1) vat photopolymerization (e.g., stereolithography), in which an object is constructed layer by layer from a vat of liquid photopolymer resin; (2) material jetting, in which material is jetted onto a build platform using either a continuous or drop on demand (DOD) approach; (3) binder jetting, in which alternating layers of a build material (e.g., a powder-based material) and a binding material (e.g., a liquid binder) are deposited by a print head; (4) fused deposition modeling (FDM), in which material is drawn though a nozzle, heated, and deposited layer by layer; (5) powder bed fusion, including but not limited to direct metal laser sintering (DMLS), electron beam melting (EBM), selective heat sintering (SHS), selective laser melting (SLM), and selective laser sintering (SLS); (6) sheet lamination, including but not limited to laminated object manufacturing (LOM) and ultrasonic additive manufacturing (UAM); and (7) directed energy deposition, including but not limited to laser engineering net shaping, directed light fabrication, direct metal deposition, and 3D laser cladding. For example, stereolithography can be used to directly fabricate one or more of the appliances herein. In some embodiments, stereolithography involves selective polymerization of a photosensitive resin (e.g., a photopolymer) according to a desired cross-sectional shape using light (e.g., ultraviolet light). The object geometry can be built up in a layer-by-layer fashion by sequentially polymerizing a plurality of object cross-sections. As another example, the appliances herein can be directly fabricated using selective laser sintering. In some embodiments, selective laser sintering involves using a laser beam to selectively melt and fuse a layer of powdered material according to a desired cross-sectional shape in order to build up the object geometry. As yet another example, the appliances herein can be directly fabricated by fused deposition modeling. In some embodiments, fused deposition modeling involves melting and selectively depositing a thin filament of thermoplastic polymer in a layer-by-layer manner in order to form an object. In yet another example, material jetting can be used to directly fabricate the appliances herein. In some embodiments, material jetting involves jetting or extruding one or more materials onto a build surface in order to form successive layers of the object geometry.

In some embodiments, the direct fabrication methods provided herein build up the object geometry in a layer-by-layer fashion, with successive layers being formed in discrete build steps. Alternatively or in combination, direct fabrication methods that allow for continuous build-up of an object geometry can be used, referred to herein as “continuous direct fabrication.” Various types of continuous direct fabrication methods can be used. As an example, in some embodiments, the appliances herein are fabricated using “continuous liquid interphase printing,” in which an object is continuously built up from a reservoir of photopolymerizable resin by forming a gradient of partially cured resin between the building surface of the object and a polymerization-inhibited “dead zone.” In some embodiments, a semi-permeable membrane is used to control transport of a photopolymerization inhibitor (e.g., oxygen) into the dead zone in order to form the polymerization gradient. Continuous liquid interphase printing can achieve fabrication speeds about 25 times to about 100 times faster than other direct fabrication methods, and speeds about 1000 times faster can be achieved with the incorporation of cooling systems. Continuous liquid interphase printing is described in U.S. Patent Publication Nos. 2015/0097315, 2015/0097316, and 2015/0102532, the disclosures of each of which are incorporated herein by reference in their entirety.

As another example, a continuous direct fabrication method can achieve continuous build-up of an object geometry by continuous movement of the build platform (e.g., along the vertical or Z-direction) during the irradiation phase, such that the hardening depth of the irradiated photopolymer is controlled by the movement speed. Accordingly, continuous polymerization of material on the build surface can be achieved. Such methods are described in U.S. Pat. No. 7,892,474, the disclosure of which is incorporated herein by reference in its entirety.

In another example, a continuous direct fabrication method can involve extruding a composite material composed of a curable liquid material surrounding a solid strand. The composite material can be extruded along a continuous three-dimensional path in order to form the object. Such methods are described in U.S. Patent Publication No. 2014/0061974.

In yet another example, a continuous direct fabrication method utilizes a “heliolithography” approach in which the liquid photopolymer is cured with focused radiation while the build platform is continuously rotated and raised. Accordingly, the object geometry can be continuously built up along a spiral build path. Such methods are described in U.S. Patent Publication No. 2014/0265034, the disclosure of which is incorporated herein by reference in its entirety.

The direct fabrication approaches provided herein are compatible with a wide variety of materials, including but not limited to one or more of the following: polymer matrix reinforced with ceramic or metallic polymers, a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, a thermoplastic polyamide elastomer, or combinations thereof. The materials used for direct fabrication can be provided in an uncured form (e.g., as a liquid, resin, powder, etc.) and can be cured (e.g., by photopolymerization, light curing, gas curing, laser curing, crosslinking, etc.) in order to form an orthodontic appliance or a portion thereof. The properties of the material before curing may differ from the properties of the material after curing. Once cured, the materials herein can exhibit sufficient strength, stiffness, durability, biocompatibility, etc. for use in an orthodontic appliance. The post-curing properties of the materials used can be selected according to the desired properties for the corresponding portions of the appliance.

In some embodiments, relatively rigid portions of the orthodontic appliance can be formed via direct fabrication using one or more of the following materials: a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, and/or a polytrimethylene terephthalate.

In some embodiments, relatively elastic portions of the orthodontic appliance can be formed via direct fabrication using one or more of the following materials: a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, and/or a thermoplastic polyamide elastomer.

Optionally, the direct fabrication methods described herein allow for fabrication of an appliance including multiple materials, referred to herein as "multi-material direct fabrication." In some embodiments, a multi-material direct fabrication method involves concurrently forming an object from multiple materials in a single manufacturing step using the same fabrication machine and method. For instance, a multi-tip extrusion apparatus can be used to selectively dispense multiple types of materials (e.g., resins, liquids, solids, or combinations thereof) from distinct material supply sources in order to fabricate an object from a plurality of different materials. Such methods are described in U.S. Pat. No. 6,749,414, the disclosure of which is incorporated herein by reference in its entirety. Alternatively or in combination, a multi-material direct fabrication method can involve forming an object from multiple materials in a plurality of sequential manufacturing steps. For instance, a first portion of the object can be formed from a first material in accordance with any of the direct fabrication methods herein, then a second portion of the object can be formed from a second material in accordance with methods herein, and so on, until the entirety of the object has been formed. The relative arrangement of the first and second portions can be varied as desired, e.g., the first portion can be partially or wholly encapsulated by the second portion of the object. The sequential manufacturing steps can be performed using the same fabrication machine or different fabrication machines, and can be performed using the same fabrication method or different fabrication methods. For example, a sequential multi-manufacturing procedure can involve forming a first portion of the object using stereolithography and a second portion of the object using fused deposition modeling.

Direct fabrication can provide various advantages compared to other manufacturing approaches. For instance, in contrast to indirect fabrication, direct fabrication permits production of an orthodontic appliance without utilizing any molds or templates for shaping the appliance, thus reducing the number of manufacturing steps involved and improving the resolution and accuracy of the final appliance geometry. Additionally, direct fabrication permits precise control over the three-dimensional geometry of the appliance, such as the appliance thickness. Complex structures and/or auxiliary components can be formed integrally as a single piece with the appliance shell in a single manufacturing step, rather than being added to the shell in a separate manufacturing step. In some embodiments, direct fabrication is used to produce appliance geometries that would be difficult to create using alternative manufacturing techniques, such as appliances with very small or fine features, complex geometric shapes, undercuts, interproximal structures, shells with variable thicknesses, and/or internal structures (e.g., for improving strength with reduced weight and material usage). For example, in some embodiments, the direct fabrication approaches herein permit fabrication of an orthodontic appliance with feature sizes of less than or equal to about 5 μm, or within a range from about 5 μm to about 50 μm, or within a range from about 20 μm to about 50 μm.

The direct fabrication techniques described herein can be used to produce appliances with substantially isotropic material properties, e.g., substantially the same or similar strengths along all directions. In some embodiments, the direct fabrication approaches herein permit production of an orthodontic appliance with a strength that varies by no more than about 25%, about 20%, about 15%, about 10%, about 5%, about 1%, or about 0.5% along all directions. Additionally, the direct fabrication approaches herein can be used to produce orthodontic appliances at a faster speed compared to other manufacturing techniques. In some embodiments, the direct fabrication approaches herein allow for production of an orthodontic appliance in a time interval less than or equal to about 1 hour, about 30 minutes, about 25 minutes, about 20 minutes, about 15 minutes, about 10 minutes, about 5 minutes, about 4 minutes, about 3 minutes, about 2 minutes, about 1 minutes, or about 30 seconds. Such manufacturing speeds allow for rapid "chair-side" production of customized appliances, e.g., during a routine appointment or checkup.

In some embodiments, the direct fabrication methods described herein implement process controls for various machine parameters of a direct fabrication system or device in order to ensure that the resultant appliances are fabricated with a high degree of precision. Such precision can be beneficial for ensuring accurate delivery of a desired force system to the teeth in order to effectively elicit tooth movements. Process controls can be implemented to account for process variability arising from multiple sources, such as the material properties, machine parameters, environmental variables, and/or post-processing parameters.

Material properties may vary depending on the properties of raw materials, purity of raw materials, and/or process variables during mixing of the raw materials. In many embodiments, resins or other materials for direct fabrication should be manufactured with tight process control to ensure little variability in photo-characteristics, material properties (e.g., viscosity, surface tension), physical properties (e.g., modulus, strength, elongation) and/or thermal properties (e.g., glass transition temperature, heat deflection temperature). Process control for a material manufacturing process can be achieved with screening of raw materials for physical properties and/or control of temperature, humidity, and/or other process parameters during the mixing process. By implementing process controls for the material manufacturing procedure, reduced variability of process parameters and more uniform material properties for each batch of material can be achieved. Residual variability in material properties can be compensated with process control on the machine, as discussed further herein.

Machine parameters can include curing parameters. For digital light processing (DLP)-based curing systems, curing parameters can include power, curing time, and/or grayscale of the full image. For laser-based curing systems, curing parameters can include power, speed, beam size, beam shape and/or power distribution of the beam. For printing systems, curing parameters can include material drop size, viscosity, and/or curing power. These machine parameters can be monitored and adjusted on a regular basis (e.g., some parameters at every 1-x layers and some parameters after each build) as part of the process control on the fabrication machine. Process control can be achieved by including a sensor on the machine that measures power and other beam parameters every layer or every few seconds and automatically adjusts them with a feedback loop. For DLP machines, gray scale can be measured and calibrated before, during, and/or at the end of each build, and/or at predetermined time intervals (e.g., every nth build, once per hour, once per day, once per week, etc.), depending on the stability of the system. In addition, material properties and/or photo-characteristics can be provided to the fabrication machine, and a machine process control module can use these parameters to adjust machine parameters (e.g., power, time, gray scale, etc.) to compensate for variability in material properties. By implementing process controls for the fabrication machine, reduced variability in appliance accuracy and residual stress can be achieved.

In many embodiments, environmental variables (e.g., temperature, humidity, Sunlight or exposure to other energy/curing source) are maintained in a tight range to reduce variable in appliance thickness and/or other properties. Optionally, machine parameters can be adjusted to compensate for environmental variables.

In many embodiments, post-processing of appliances includes cleaning, post-curing, and/or support removal processes. Relevant post-processing parameters can include purity of cleaning agent, cleaning pressure and/or temperature, cleaning time, post-curing energy and/or time, and/or consistency of support removal process. These parameters can be measured and adjusted as part of a process control scheme. In addition, appliance physical properties can be varied by modifying the post-processing parameters. Adjusting post-processing machine parameters can provide another way to compensate for variability in material properties and/or machine properties.

Although specific reference is made to oral components, such as orthodontic devices and molds for orthodontic devices, the methods and apparatus disclosed herein will find application many fields such implantable devices, cardiology, orthopedics, and generally product design within the healthcare industry. It may also be useful in other industries such as aviation, automotive, in particular for component fabrication etc.

FIG. 1A illustrates an exemplary tooth repositioning appliance or aligner 100 that can be worn by a patient in order to achieve an incremental repositioning of individual teeth 102 in the jaw. The appliance can include a shell (e.g., a continuous polymeric shell or a segmented shell) having teeth-receiving cavities that receive and resiliently reposition the teeth. An appliance or portion(s) thereof may be indirectly fabricated using a physical model of teeth. For example, an appliance (e.g., polymeric appliance) can be formed using a physical model of teeth and a sheet of suitable layers of polymeric material. In some embodiments, a physical appliance is directly fabricated, e.g., using additive manufacturing techniques, from a digital model of an appliance. An appliance can fit over all teeth present in an upper or lower jaw, or less than all of the teeth. The appliance can be designed specifically to accommodate the teeth of the patient (e.g., the topography of the tooth-receiving cavities matches the topography of the patient's teeth), and may be fabricated based on positive or negative models of the patient's teeth generated by impression, scanning, and the like. Alternatively, the appliance can be a generic appliance configured to receive the teeth, but not necessarily shaped to match the topography of the patient's teeth. In some cases, only certain teeth received by an appliance will be repositioned by the appliance while other teeth can provide a base or anchor region for holding the appliance in place as it applies force against the tooth or teeth targeted for repositioning. In some cases, some or most, and even all, of the teeth will be repositioned at some point during treatment. Teeth that are moved can also serve as a base or anchor for holding the appliance as it is worn by the patient. Typically, no wires or other means will be provided for holding an appliance in place over the teeth. In some cases, however, it may be desirable or necessary to provide individual attachments or other anchoring elements 104 on teeth 102 with corresponding receptacles or apertures 106 in the appliance 100 so that the appliance can apply a selected force on the tooth. Exemplary appliances, including those utilized in the Invisalign® System, are described in numerous patents and patent applications assigned to Align Technology, Inc. including, for example, in U.S. Pat. Nos. 6,450,807, and 5,975,893, as well as on the company's website, which is accessible on the World Wide Web (see, e.g., the url "invisalign.com"). Examples of tooth-mounted attachments suitable for use with orthodontic appliances are also described in patents and patent applications assigned to Align Technology, Inc., including, for example, U.S. Pat. Nos. 6,309,215 and 6,830,450.

Optionally, in cases involving more complex movements or treatment plans, it may be beneficial to utilize auxiliary components (e.g., features, accessories, structures, devices, components, and the like) in conjunction with an orthodontic appliance. Examples of such accessories include but are not limited to elastics, wires, springs, bars, arch expanders, palatal expanders, twin blocks, occlusal blocks, bite ramps, mandibular advancement splints, bite plates, pontics, hooks, brackets, headgear tubes, springs, bumper tubes, palatal bars, frameworks, pin-and-tube apparatuses, buccal shields, buccinator bows, wire shields, lingual flanges and pads, lip pads or bumpers, protrusions, divots, power arms, distalizing devices, such as a distalizer and the like. In some embodiments, the appliances, systems and methods described herein include improved orthodontic appliances with integrally formed features that are shaped to couple to such auxiliary components, or that replace such auxiliary components.

Figure 1B:
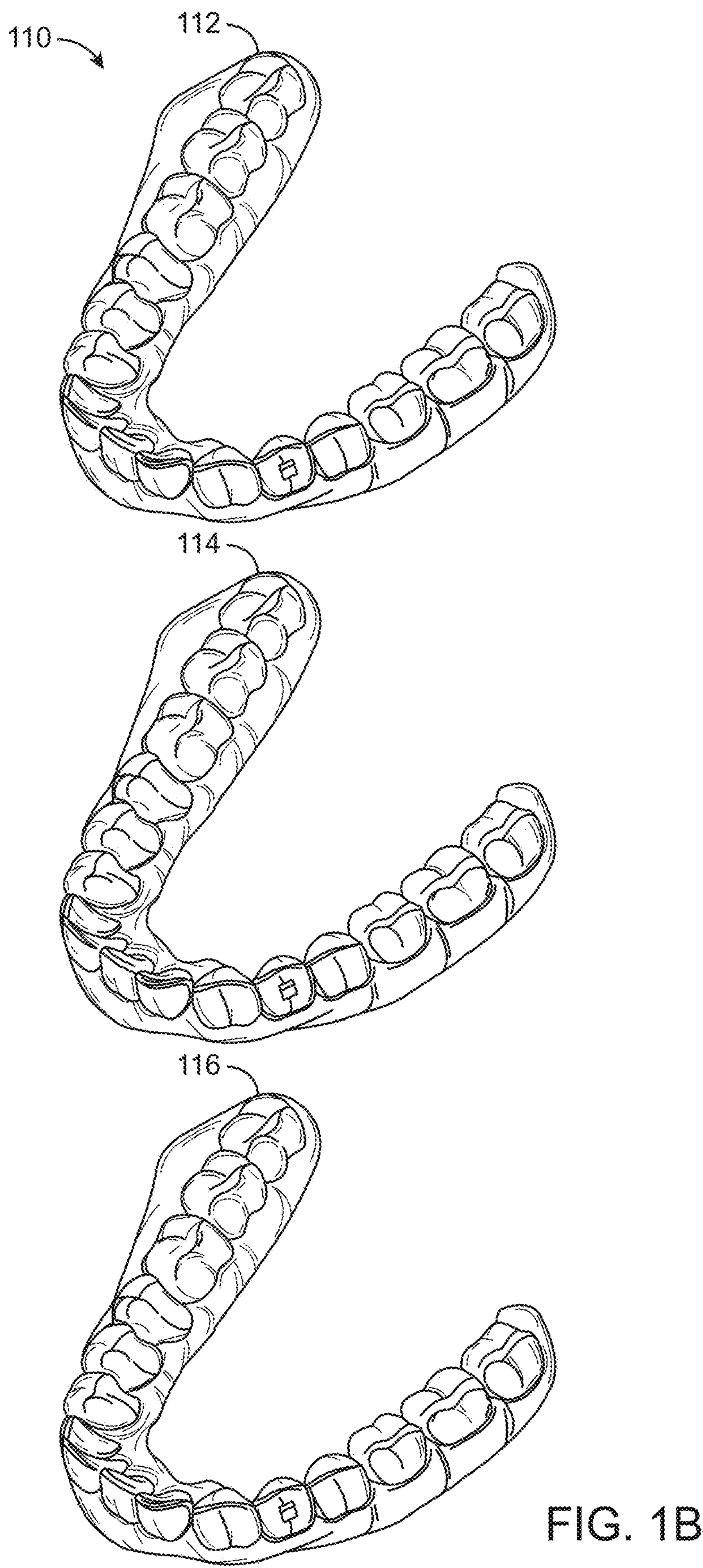
FIG. 1B shows a tooth repositioning system, in accordance with some embodiments.

FIG. 1B illustrates a tooth repositioning system 110 including a plurality of appliances 112, 114, 116. Any of the appliances described herein can be designed and/or provided as part of a set of a plurality of appliances used in a tooth repositioning system. Each appliance may be configured so a tooth-receiving cavity has a geometry to move the teeth towards an intermediate or final tooth arrangement intended for the appliance. The patient's teeth can be progressively repositioned from an initial tooth arrangement towards a target tooth arrangement by placing a series of incremental position adjustment appliances on the patient's teeth. For example, the tooth repositioning system 110 can include a first appliance 112 corresponding to an initial tooth arrangement, one or more intermediate appliances 114 corresponding to one or more intermediate arrangements, and a final appliance 116 corresponding to a target arrangement. A target tooth arrangement can be a planned final tooth arrangement selected for the patient's teeth at the end of all planned orthodontic treatment. Alternatively, a target arrangement can be one of some intermediate arrangements for the patient's teeth during the course of orthodontic treatment, which may include various different treatment scenarios, including, but not limited to, instances where surgery is recommended, where interproximal reduction (IPR) is appropriate, where a progress check is scheduled, where anchor placement is best, where palatal expansion is desirable, where restorative dentistry is involved (e.g., inlays, onlays, crowns, bridges, implants, veneers, and the like), etc. As such, it is understood that a target tooth arrangement can be any planned resulting arrangement for the patient's teeth that follows one or more incremental repositioning stages. Likewise, an initial tooth arrangement can be any initial arrangement for the patient's teeth that is followed by one or more incremental repositioning stages.

Figure 1C:
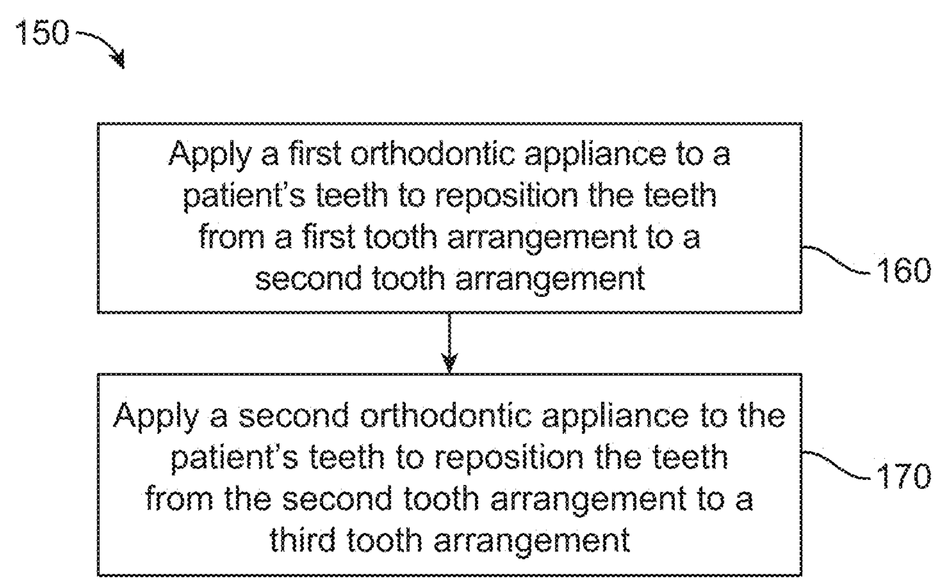
FIG. 1C shows a method of orthodontic treatment using a plurality of appliances, in accordance with some embodiments.

FIG. 1C illustrates a method 150 of orthodontic treatment using a plurality of appliances, in accordance with embodiments. The method 150 can be practiced using any of the appliances or appliance sets described herein. In step 160, a first orthodontic appliance is applied to a patient's teeth in order to reposition the teeth from a first tooth arrangement to a second tooth arrangement. In step 170, a second orthodontic appliance is applied to the patient's teeth in order to reposition the teeth from the second tooth arrangement to a third tooth arrangement. The method 150 can be repeated as necessary using any suitable number and combination of sequential appliances in order to incrementally reposition the patient's teeth from an initial arrangement to a target arrangement. The appliances can be generated all at the same stage or in sets or batches (e.g., at the beginning of a stage of the treatment), or the appliances can be fabricated one at a time, and the patient can wear each appliance until the pressure of each appliance on the teeth can no longer be felt or until the maximum amount of expressed tooth movement for that given stage has been achieved. A plurality of different appliances (e.g., a set) can be designed and even fabricated prior to the patient wearing any appliance of the plurality. After wearing an appliance for an appropriate period of time, the patient can replace the current appliance with the next appliance in the series until no more appliances remain. The shell appliances are generally not affixed to the teeth and the patient may place and replace the appliances at any time during the procedure (e.g., patient-removable appliances). Other appliances, such as distalizing devices and power arms may be affixed to the patient's teeth. The final appliance or several appliances in the series may have a geometry or geometries selected to overcorrect the tooth arrangement. For instance, one or more appliances may have a geometry that would (if fully achieved) move individual teeth beyond the tooth arrangement that has been selected as the "final." Such over-correction may be desirable in order to offset potential relapse after the repositioning method has been terminated (e.g., permit movement of individual teeth back toward their pre-corrected positions). Over-correction may also be beneficial to speed the rate of correction (e.g., an appliance with a geometry that is positioned beyond a desired intermediate or final position may shift the individual teeth toward the position at a greater rate). In such cases, the use of an appliance can be terminated before the teeth reach the positions defined by the appliance. Furthermore, over-correction may be deliberately applied in order to compensate for any inaccuracies or limitations of the appliance.

Figure 2B:
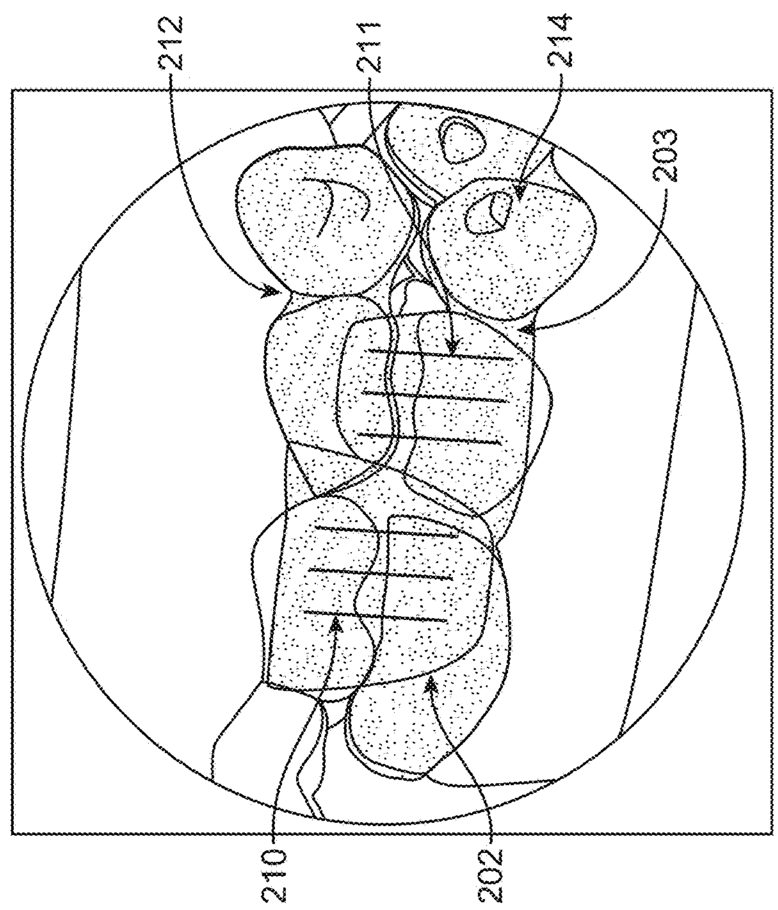
FIGS. 2A and 2B show an example of a metal reinforced polymeric orthodontic aligner with mandibular advancement devices, in accordance with some embodiments.
Figure 2A:
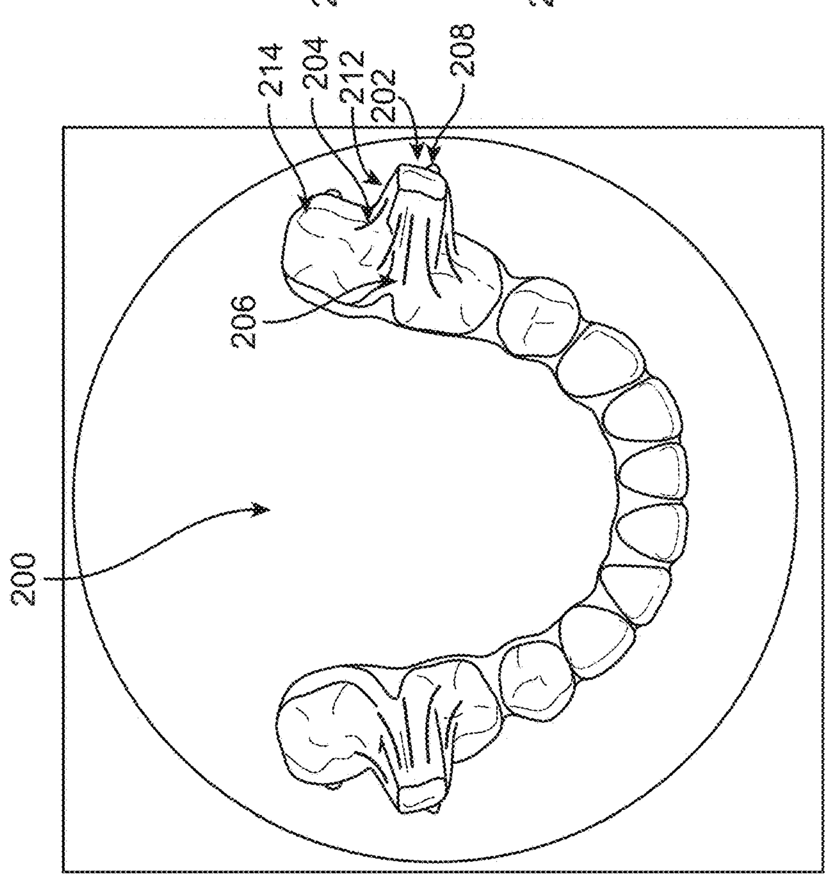

FIGS. 2A and 2B show an example of metal reinforced polymeric orthodontic aligners 200 with mandibular advancement devices 202 sometimes referred to as precision wings. Mandibular advancement devices 202 function to advance mandibula of a patient over time. The upper mandibular advancement device 202 pushes against the lower mandibular advancement device attached to the lower arch of the patient in order to reposition the patient's lower jaw or mandible. Large amounts of force are applied by to each of the mandibular advancement devices. The forces cause deformation and over time may potentially cause buckling and other undesirable deformations of the mandibular advancement devices. Polymeric mandibular advancement device may include ribs or gussets such as gusset 212 and rib 208 formed as part of the polymeric mandibular advancement device.

As shown in the polymeric orthodontic aligners 200 of FIGS. 2A and 2B metal reinforcements may be added to the mandibular advancement devices and the portions of the aligner adjacent to the mandibular advancement devices in order to provide added stiffness and durability to the aligner and its mandibular advancement devices. The metal reinforcements may also allow for increased forces to be transmitted between the upper and lower mandibular advancement devices as compared to such structures without metal reinforcement. FIG. 2A shows metal reinforcement in lingual sidewalls of the mandibular advancement devices while FIG. 2B shows metal reinforcements in the buccal sidewalls of the mandibular advancement devices.

With reference to FIG. 2A, a metal reinforcement 204 which may be a metal fiber, extends from a distal end of the mandibular advancement device 202 along a distal gusset 212 and into the wall of the adjacent tooth receiving cavity 214. The metal fiber 204 has a greater stiffness and Young's modulus as compared to the polymer in the aligner 200 and the mandibular advancement device 202. This greater stiffness and Young's modulus results in reduced bending and deformation along the gusset. Similarly, additional fibers 206 may be located along the lingual facing surface extending from a distal end of the mandibular advancement device 202 and onto a wall, such as an occlusal wall of a tooth receiving cavity in the aligner 200. Additional metal reinforcement may be provided along the mesial gusset of the mandibular advancement device 202.

In some embodiments, the fiber may be a silver fiber. In some embodiment, the fiber may have a shear modulus of elasticity of about 30 GPa, or between about 20 GPa and about 40 GPa and a bulk modulus of elasticity of about 100 GPa or between about 75 GPa and about 125 GPa. In some embodiments, the polymer have a shear modulus of elasticity of about 1 GPa, or between about 0.5 GPa and about 1.5 GPa and a bulk modulus of elasticity of about 2 GP GPa or between about 1.5 GPa and about 2.5 GPa. In some embodiments, the fiber may have a shear modulus about 30 times the shear modulus of the polymer and a bulk modulus of about 50 times the polymer. In some embodiments, the fiber may have a shear modulus between about 20 time and about 40 times the shear modulus of the polymer and a bulk modulus between about 40 times and about 60 times the polymer. In some embodiments, the fiber may have a shear modulus between about 25 time and about 35 times the shear modulus of the polymer and a bulk modulus between about 45 times and about 55 times the polymer.

In some embodiments, the density of the metal fibers 204, 206 in the appliance 200 may vary based on expected forces or other factors, such as to reduce stress concentrations. For example, as shown in FIG. 2A the metal reinforcements may have a greater volume fraction in the sidewalls of the mandibular advancement device 208. In some embodiments, the volume fraction may be reduced as the fibers transition from the mandibular advancement device portion of the aligner into the tooth receiving cavity walls of the aligner. This arrangement may reduce stress concentrations that may otherwise develop through the use of metal reinforcement and the distributed fibers.

The volume fraction of the fibers may vary from no greater than 25% within the walls of the precision wings to less than 10% or less than 5% within the walls of the adjacent tooth receiving cavities. In some embodiments, the distance between adjacent fibers may vary. For example, fibers may be located a distance of 1 to 2 mm from each other at their respective distal ends within the sidewalls of the aligner and within the mandibular advancement device and the distance between the fibers may decrease, from the respective ends, along the length of the fiber such that at a middle portion of the fibers, such as at the gusset, the fibers are between 20 μm and 100 μm away from each other. In some embodiments, the distance may increase by a factor of more than 10%, 20%, 50%, 100%, or 200% from the distal ends of adjacent fibers within the mandibular advancement device and the ends of the respective devices within the walls of the tooth receiving cavities.

The fibers may have a diameter of between 20 μm and 1000 μm. Preferably the fibers may have a diameter between 20 μm and 100 μm. In some embodiments, the fibers may have a diameter defined with respect to the thickness of the aligner wall in which the fibers are placed. For example, the fibers may have a diameter of between 4% and 50% of the aligner thickness, preferably between 4% and 25% of the thickness of the aligner. In some embodiments, a length of the fiber may be between 10 and 100 times its diameter.

In some embodiments, the diameter of the fiber may change along its length. For example, in some embodiments, the ends of the fibers may have a diameter that is less than the diameter of a middle portion of the fiber. In some embodiments, the diameter of the fiber at a middle portion of the fiber may be more than 50% greater than the diameter of the fiber at one or both of its ends. In some embodiments, the diameter of the fiber at a middle portion of the fiber may be more than 100%, 200%, or 300% greater than the diameter of the fiber at one or both of the ends.

With reference to FIG. 2B, metal reinforcements 210 are shown in the buccal sidewalls of the mandibular advancement devices. The fibers 210 may extend from a gingival location of the mandibular advancement device 202, across an occlusal plane of the patient's dentition, to a distal end of the mandibular advancement device 202. In some embodiments, the fibers 210 may extend beyond an occlusal surface of a patient's dentition or an occlusal surface of a tooth receiving cavity proximate to the mandibular advancement device.

In some embodiments, a pair of aligners including an upper aligner for the patient's upper arch and a lower aligner for the patient's lower arch may be provided. In such embodiments, each of the upper and lower aligners may include respective mandibular advancement devices 202. Each of the mandibular advancement devices 202 may include one or more metal reinforcements 210 such as the fibers 210 shown in FIG. 2B.

As shown in FIG. 2B, the upper aligner may include mandibular advancement device 202 with fibers 210, while the lower arch may include mandibular advancement device 203 with fibers 211. Each of the fibers 210 and 211 extend from respective locations gingival of their respective aligners and across the occlusal plane of the patient's dentition or across occlusal surfaces of the aligners. As also shown in FIG. 2B, distal ends of the fibers 210, 211 may extend beyond an occlusal surface of an opposing aligner. For example, fiber 211 extends beyond, or gingival to, an occlusal surface of aligner 212 while fiber 210 extends beyond, or gingival to, and occlusal surface of aligner 214.

In some embodiments, the buccal sidewalls of a mandibular advancement device 202, 203 may include two or more fibers 210, 211. The fibers 210, 211 may be arranged parallel to each other. For example, fibers 210 and the upper mandibular advancement device 202 may be arranged parallel to each other while fibers 211 of lower mandibular advancement device 203 may similarly be arranged parallel to each other.

Figure 3:
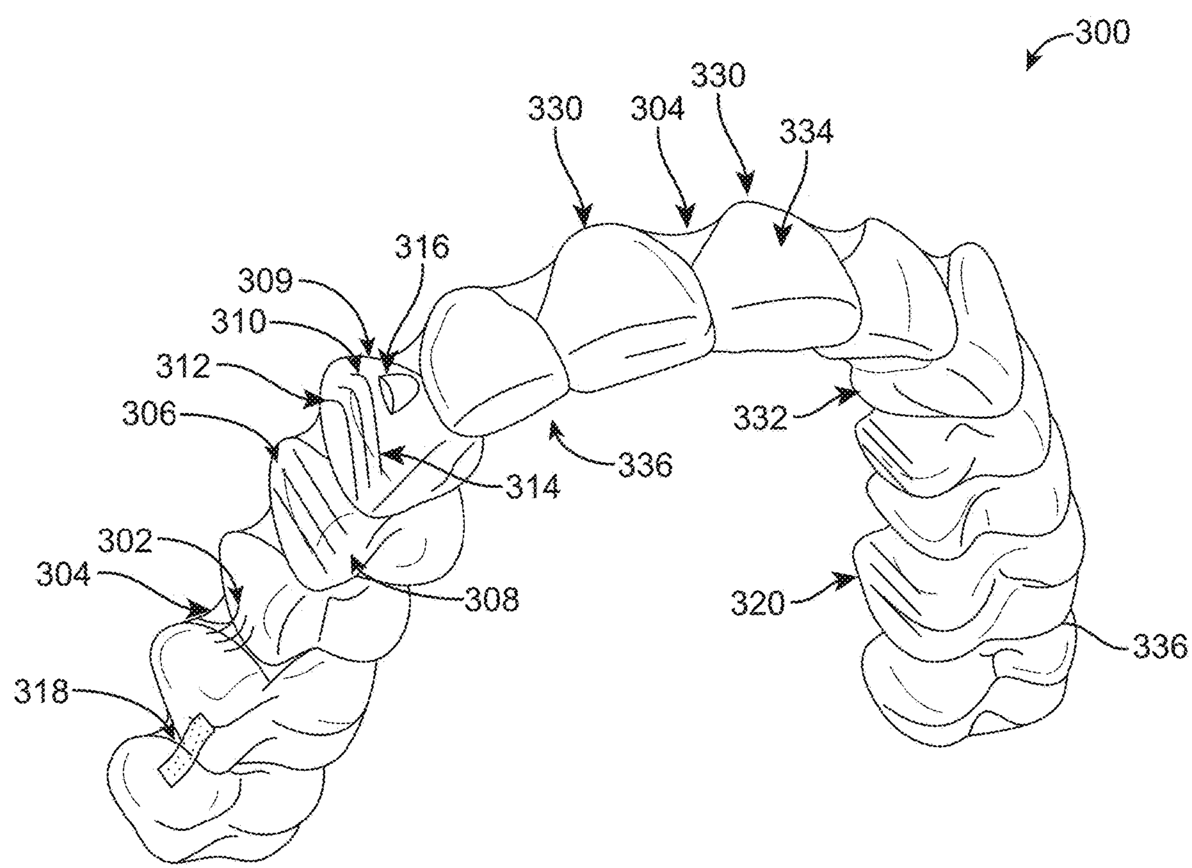
FIG. 3 shows an example of a metal reinforced polymeric orthodontic aligners, in accordance with some embodiments.

FIG. 3 shows an example of a metal reinforced polymeric orthodontic aligner. The polymeric orthodontic aligner 300 includes a plurality of tooth receiving cavities 330. Each tooth receiving cavity may have a lingual sidewall 332 a buccal sidewall 334 and occlusal or incisal surfaces 336. An interproximal portion 304 of the orthodontic aligner 300 may be located between each adjacent pair of tooth receiving cavities 330. In some embodiments, an attachment receiving cavity 316 may be located or formed in a sidewall 334, 332 of an aligner 300. An attachment receiving cavity 316 is shaped to receive an attachment located on the patient's tooth. The sidewalls 334, 332 and the interproximal portions 304 may be reinforced with metal reinforcements.

The aligner 300 may include one or more metal reinforcements structures 309, 306, 302, 318, 320 which may be fibers, patches, lattice structures or other shapes that strengthen the aligner in a particular direction or area. The fibers may also cause anisotropy in the aligner structure and allow the aligner 300 to have different stiffnesses in different directions. The direction of the stiffness may be determined based on a program tooth movement in an orthodontic treatment plan. For example, the stiffness may be increased in areas with increased force or anticipated force concentrations or in areas where the aligner is likely to bend or deform in an undesirable manner.

One or more reinforcement fibers 309 may be used to reinforce the aligner sidewall and distribute the forces imparted to an attachment receiving cavity 316 by an attachment when the aligner is worn by a patient. The fibers 309 may extend from a gingival portion of a tooth receiving cavity, such as near a gingival edge of the tooth receiving cavity, towards an occlusal or incisal surface of a tooth receiving cavity. The fibers 309 may be curved, having distally located ends 312, 314 and a mesially located apex 310. In some embodiments, the apex 310 may be nearer the attachment receiving cavity 316 than the distally located ends 312, 314. The attachment receiving cavity 316 may be located on a mesial portion of the tooth receiving cavity shown in FIG. 3, however, in some embodiments, the attachment receiving cavity 316 may be located on a distal portion of the tooth receiving cavity. In such embodiments, the fibers 309 may be curved, having the measilly located ends and a distally located apex. In some embodiments, the attachment receiving cavity may be in other orientation or locations, however the apex of the associated fibers 309 may be located nearer the attachment receiving cavity 316 than the ends of the respective fibers.

For example, when intruding a tooth with an attachment receiving cavity, the attachment receiving cavity may be oriented in a gingival-occlusal direction. In such embodiments, the apex of the of the fibers 309 may be located more gingivally than the ends of the fibers 309. Similarly, in tooth extrusion, and attachment receiving cavity may be oriented in an occlusal-gingival orientation. In such embodiments, the apex of the fibers 309 may be located more occlusally than the ends of the fibers 309.

The fibers 309 may be equidistant from each other or, in some embodiments, the distance between respective fibers 309 may vary. For example, the distance between fibers 309 may increase is a function of the distance of the fibers from the attachment receiving cavity 316. For example, the distance between the second and third fibers 309 may be greater than the distance between the first and second fibers 309. By gradually increasing the distance of fibers from each other, a stress concentration that may otherwise be caused by the fibers may be reduced.

In some embodiments, the length of the fibers 309 may increase or decrease as a function of distance from the attachment receiving cavities 316.

In some embodiments, the apex 310 of the fibers 309 may be located at a center of the fibers 309. In some embodiments, the apex 310 may be offset from the center of the fibers 309. For example, as shown in FIG. 3, the apex 310 of the fibers 309 may be located nearer a gingival edge of the fibers 309. In some embodiments, the apex 310 of the fibers 309 may be located nearer an occlusal or incisal surface of a tooth receiving cavity.

Fibers 308 are shown on a buccal side of the tooth receiving cavity 306. The fibers 308 may be used in the sidewalls of the tooth receiving cavity shaped to extrude a tooth without use of attachments. During tooth extrusion, the tooth receiving cavity acts on the undercut of the tooth in order to provide an extrusion force on the tooth. During extrusion, even a slight bow or deformation of the sidewalls of the tooth receiving cavity may reduce the already limited amount of force available to extrude the teeth. Reinforcements 308 may be added to the sidewalls of the tooth receiving cavity 306 for extrusion in order to stiffen the sidewall and reduce or prevent undesirable deformation. The fibers 308 may extend from a gingival location of the of the tooth receiving cavity 306 towards an occlusal or incisal surface of the tooth receiving cavity 306. In some embodiments, the fibers 210 may extend into the occlusal surface of the tooth receiving cavity.

In some embodiments, the sidewalls of the tooth receiving cavity 306 may include two or more fibers 308. The fibers 308 may be arranged parallel to each other. In some embodiments, tooth receiving cavity 306 may include fibers 308 in one or both of the lingual and buccal sidewalls.

Interproximal reinforcement members 302 may extend along an interproximal portion 304 of an aligner, between adjacent tooth receiving cavities. In an orthodontic aligner, stress concentrations may be formed in the interproximal region between tooth receiving cavities. For example, if a tooth is being distalized or moved in a distal direction increased forces may be applied across and interproximal region between the distalized tooth and an adjacent teeth. Reinforcements 302, which may be fibers, mesh, or other metal reinforcements may be formed within the aligner and extend from a distal portion of a first tooth receiving cavity and across an interproximal location and to a mesial portion of a second, adjacent tooth receiving cavity. The reinforcements may include a plurality of fibers 302 arranged parallel to each other and extending along a mesial-distal direction. For example, each of the fibers may have a first end in a distal portion of a tooth receiving cavity of the aligner and a second end in a mesial portion of an adjacent tooth receiving cavity of the aligner.

In some embodiments, reinforcement members 318 may extend along a plurality of tooth receiving cavities of an aligner. For example, reinforcement members 318 may extend between two or more adjacent tooth receiving cavities. In an orthodontic aligner or a retainer, the patient may have a missing tooth or have a large interproximal gap between adjacent teeth. Aligners rely on the patient's teeth in order to provide additional structural rigidity to the aligner and to prevent deformations into the teeth. However, if a tooth is missing or the patient has a large interproximal gap, an aligner may be unsupported across a large portion of its length. The unsupported portions of the aligner may deform under relatively low loads and therefore may not be able to transmit forces desired for tooth movement. Reinforcement members 318 may be used to stiffen and add strength to the aligner across portions of the aligner where the patient is missing a tooth or an interproximal region.

As shown in FIG. 3, reinforcement member 318, which may be a band, may be formed within the aligner sidewall and extend from a distal portion of a first tooth receiving cavity, across an interproximal location, and to a mesial portion of a second, adjacent tooth receiving cavity. In some embodiments, reinforcement members 318 may have a first end in a distal portion of a tooth receiving cavity of the aligner and a second end in a mesial portion of an adjacent tooth receiving cavity of the aligner.

In some embodiments, for example when the patient is missing a tooth, reinforcement members 318 may be formed within the aligner and extend from a distal portion of a first tooth receiving cavity, across a location of the missing tooth, and to a mesial portion of a second tooth receiving cavity. In some embodiments, reinforcement members 318 may have a first end in a distal portion of a tooth receiving cavity of the aligner, extend across a location of the missing tooth to a second end in a mesial portion of a second tooth receiving cavity of the aligner.

The reinforcement members 318 that extends across an interproximal region or a gap in the patient's dentition may have thickness of between 20 μm and 1000 μm. Preferably the reinforcement members 318 may have a thickness between 20 μm and 100 μm. In some embodiments, the reinforcement members 318 may have a thickness defined with respect to the thickness of the aligner wall in which the reinforcement members are placed. For example, the reinforcement members 318 may have a thickness of between 4% and 50% of the aligner thickness, preferably between 4% and 25% of the thickness of the aligner. In some embodiments, a length of the reinforcement members 318 may be between five and 10 times its width. In some embodiments, the width of the reinforcement members 318 may change along their length. For example, in some embodiments, the ends of the reinforcement members 318 may have a width that is less than the width of a middle portion of the reinforcement members 318. In some embodiments, the width of the reinforcement members 318 at a middle portion of the reinforcement members may be more than 50% greater than the width of the reinforcement members at one or both of its ends. In some embodiments, the width of the reinforcement members at a middle portion of the reinforcement members may be more than 100%, 200%, or 300% greater than the width of the reinforcement members at one or both of the ends.

In some embodiments, the ends of the reinforcement members 318 may have a width that is greater than the width of a middle portion of the reinforcement members 318. In some embodiments, the width of the reinforcement members 318 at a middle portion of the reinforcement members may be more than 50% less than the width of the reinforcement members at one or both of its ends. In some embodiments, the width of the reinforcement members at an end portion of the reinforcement members 318 may be 100%, 200%, or 300% greater than the width of the reinforcement members at a middle portion.

In some embodiments, a length of the reinforcement members 318 may be 3 to 10 times their width.

Any of the reinforcement members discussed herein may also be placed on a lingual side of an aligner. For example, as shown in FIG. 3, lingual reinforcement members 320 are placed on or in lingual sidewalls of the aligner 300. Reinforcement members 320 are depicted as having similar shapes and relationships as those of reinforcement members 308, however buccal reinforcement members may have the shapes, locations, and properties of any of the reinforcement members 302, 306, 309, 318. In some embodiments, similar reinforcement members may be placed on both the lingual and buccal sidewalls of in orthodontic aligner 300. For example, during distalization of a tooth, reinforcement members 302 may be placed across the interproximal region of both the buccal and lingual sidewalls of adjacent tooth receiving cavities. Similarly, reinforcement members 318 may be placed across one or more tooth receiving cavities corresponding to a location of a patient's missing tooth or a large interproximal gap between tooth receiving cavities.

FIGS. 4A, 4B, and 4C show examples of metal reinforced polymeric buttons and hooks. FIGS. 4A and 4B depict a side view and cross-sectional view, respectively, of an aligner 400 having a button 404 extending from a sidewall 402 of the tooth receiving cavity. A button 404 may include a post 406 extending from the sidewall 402 of the aligner and terminating at a button head 405. The post and button head are cantilevered out from the sidewall 402 of the aligner and are shaped to receive an elastic, such as elastic 408, that is used to exert tooth and jaw moving forces to the patient's arches. In some embodiments, the force imparted on the post by the elastic and the cantilevered structure of the post may cause increased loads at the base of the post and the sidewall of the aligner. In addition, the shape of the post-aligner junction may also cause a stress concentration between the post 405 and the sidewall 402 of the tooth receiving cavity of the aligner.

Metal reinforcements 410 may be formed within the post 406 and the sidewall 402. For example, metal reinforcements 410 may have a first end within the post 406 of the button 404 and extend through the junction between the post and the sidewall and terminate at a second end within the sidewall 402 of the tooth receiving cavity. First portions of the one or more reinforcement members 410 may extend parallel to each other along the length of the shaft 406. Second portions of the one or more reinforcement members 410 may extend radially outward from the shaft within the sidewall 402 of the tooth receiving cavity.

In some embodiments, for example as shown in FIG. 4B, the first end of a reinforcement member 410 may be located within the head 405 of the button 404. A first portion of the fiber 410 may extend from the first end, radially inward towards the junction of the shaft 406 with the head 405. A second portion may extend parallel with the length of the shaft 406 from the junction of the button to the junction with the sidewall 402 of the tooth receiving cavity. A third portion of the fiber 410 may extend radially outward from the junction of the shaft 406 with in the sidewall 402.

In some embodiments, the density of the fibers 410 may vary based on expected forces or other factors, such as to reduce stress concentrations. For example, as shown in FIGS. 4A and 4B, the metal reinforcements may have a greater volume fraction in the shaft 406 and the locations where the shaft 406 meets the head 405 and the sidewall 410 and the volume fraction may be reduced as the reinforcements extend away from the shaft 406 and into the head 405 or the sidewall 402 of the aligner. In such a way, stress concentrations that may otherwise develop through the use of metal reinforcement may be reduced by the more distributed fibers. The changes in volume fraction also allow for greater concentrations of stronger material, such as metal, in locations where greater forces are expected as compared to concentrations of the stronger material at locations where lower forces are expected. The volume fraction of the fibers may vary from no greater than 25% within the shaft 406 to less than 10% or less than 5% within the walls of the adjacent tooth receiving cavities and the button head 405. In some embodiments, the distance between adjacent fibers may vary. For example, fibers may be located a distance of 1 to 2 mm from each other at their respective distal ends within the sidewalls of the tooth receiving cavities and within the button head 406 and the distance between the fibers may increase along the length of the fiber such that at a second end of the fibers, they are 2 to 4 mm from each other. In some embodiments, the distance may increase by a factor of more than 10%, 20%, 50%, 100%, or 200% from the distal ends of adjacent fibers within the shaft and the ends of the respective devices within the walls of the tooth receiving cavities.

The fibers may have a diameter of between 20 μm and 1000 μm. Preferably the fibers may have a diameter between 20 μm and 100 μm. In some embodiments, the fibers may have a diameter defined with respect to the thickness of the aligner wall in which the fibers are placed. For example, the fibers may have a diameter of between 4% and 50% of the aligner thickness, preferably between 4% and 25% of the thickness of the aligner. In some embodiments, a length of the fiber may be between 10 and 100 times its diameter. In some embodiments, the diameter of the fiber may change along its length. For example, in some embodiments, the ends of the fibers may have a diameter that is less than the diameter of a middle portion of the fiber. In some embodiments, the diameter of the fiber at a middle portion of the fiber may be more than 50% greater than the diameter of the fiber at one or both of its ends. In some embodiments, the diameter of the fiber at a middle portion of the fiber may be more than 100%, 200%, or 300% greater than the diameter of the fiber at one or both of the ends.

In some embodiments, reinforcement 410 may include a fiber having a single end within a shaft 406. The reinforcement 410 may extend along the shaft as a single fiber and then, at a location proximate the junction between the shaft 406 and the sidewall 402, the fiber may split into two or more fibers that may then extend radially away from the shaft 406, within the sidewall 402. A diameter of the reinforcement fiber 410 within the shaft may be greater than the diameter of the reinforcement fibers within the sidewall 402.

FIG. 4C depicts a cross-sectional view of an aligner 400 having a look 430 extending from a sidewall 402 of the tooth receiving cavity. A hook 430 may include a shaft 431 extending from the sidewall 402 of the aligner and terminating at a tip 433. The shaft 431 and tip 433 extend from the sidewall 402 of the aligner and are shaped to receive an elastic that is used to exert tooth and jaw moving forces to the patient's arches. In some embodiments, the force imparted on the hook 430 by the elastic may cause increased loads at the base of the shaft and the sidewall of the aligner. In addition, the shape of the shaft-aligner junction may also cause a stress concentration between the shaft 431 and the sidewall 402 of the tooth receiving cavity of the aligner.

Metal reinforcements 432, 434 may be formed within the hook 430 and the sidewall 402. For example, metal reinforcements 432, 434 may have a first end within the shaft 431 and extend through the junction between the shaft and the sidewall and may end at a second end within the sidewall 402 of the tooth receiving cavity. First portions of the one or more reinforcement members 432, 434 may extend parallel to each other along the length of the shaft 431. Second portions of the one or more reinforcement members 432, 434 may extend radially outward from the shaft within the sidewall 402 of the tooth receiving cavity.

In some embodiments, the reinforcement members 432, 434 may extend from the tip 433 of the hook 430 through the shaft 431, and into the sidewall 402 of the tooth receiving cavity. In some embodiments the fibers follow the contour of the external surface of the hook 433 and the sidewall 402.

In some embodiments, the density of the fibers 432, 434 may vary based on expected forces or other factors, such as to reduce stress concentrations. For example, as shown in FIG. 4C, the metal reinforcements may have a greater volume fraction in the shaft 431 and the locations where the shaft 431 meets the sidewall 410 than the volume fraction of the reinforcements 432, 434 as they extend away from the shaft 406 and into the sidewall 402 of the aligner. In such a way, stress concentrations that may otherwise develop through the use of metal reinforcement may be reduced by the distributed fibers.

The changes in volume fraction also allow for greater concentrations of stronger material, such as metal, in locations where greater forces are expected, as compared to concentrations of the stronger material at locations where lower forces are expected. The volume fraction of the fibers may vary from no greater than 25% within the shaft 431 to less than 10% or less than 5% within the walls of the adjacent tooth receiving cavities. In some embodiments, the distance between adjacent fibers may vary. For example, fibers may be located a distance of 1 to 2 mm from each other at their respective distal ends within the sidewalls of the tooth receiving cavities and the distance between the fibers may increase along the length of the fiber such that at a second end of the fibers, they are 2 to 4 mm from each other. In some embodiments, the distance may increase by a factor of more than 10%, 20%, 50%, 100%, or 200% from the distal ends of adjacent fibers within the shaft and the ends of the respective devices within the walls of the tooth receiving cavities.

The fibers may have a diameter of between 20 μm and 1000 μm. Preferably the fibers may have a diameter between 20 μm and 100 μm. In some embodiments, the fibers may have a diameter defined with respect to the thickness of the aligner wall in which the fibers are placed. For example, the fibers may have a diameter of between 4% and 50% of the aligner thickness, preferably between 4% and 25% of the thickness of the aligner. In some embodiments, a length of the fiber may be between 10 and 100 times its diameter. In some embodiments, the diameter of the fiber may change along its length. For example, in some embodiments, the ends of the fibers may have a diameter that is less than the diameter of a middle portion of the fiber. In some embodiments, the diameter of the fiber at a middle portion of the fiber may be more than 50% greater than the diameter of the fiber at one or both of its ends. In some embodiments, the diameter of the fiber at a middle portion of the fiber may be more than 100%, 200%, or 300% greater than the diameter of the fiber at one or both of the ends.

In some embodiments, reinforcement 432, 434 may include a fiber having a single end within a shaft 431. The reinforcement 432, 434 may extend along the shaft as a single fiber and then at a location proximate the junction between the shaft 431 and the sidewall 402 the fiber may split into two or more fibers that may then extend radially within the sidewall 402 away from the shaft 431. A diameter of the reinforcement fiber 432, 434 within the shaft may be greater than the diameter of the reinforcement fibers within the sidewall 402.

FIGS. 5A, 5B, 5C, and 5D shows examples of directly fabricated polymeric positioners with an integrated metal distalizer. A distalizing device such as distalizer 510 shown in FIG. 5A corrects alignment of the canine teeth and molars on the upper arch of a patient. Distalizer 510 attaches at a first end 514 to a canine tooth and at a second end 512 at a molar. An elastic attached to the mesial end of the distalizer 510 and a molar on the lower arch, distalizes the canine, premolars, and molars, as a group, while rotating the molar to which the distal end 512 of the distalizer is attached.

Figure 5A:
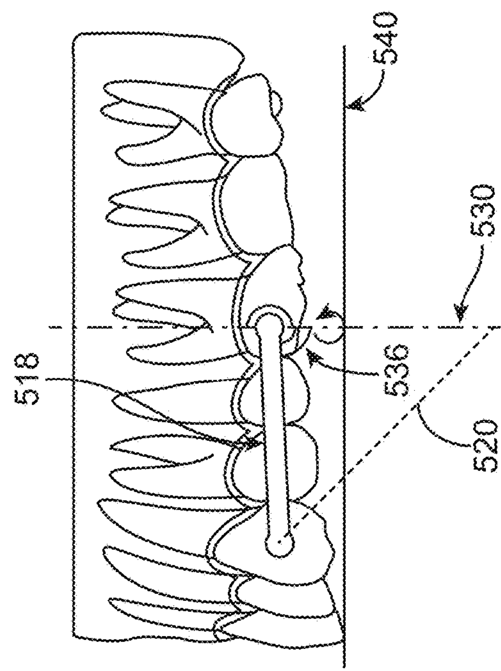
FIGS. 5A, 5B, 5C, and 5D shows examples of directly fabricated polymeric positioners with an integrated metal distalizing device, in accordance with some embodiments.

FIG. 5A shows a positioner 500 within integrated distalizer 510. The positioner 500 and integrated distalizer 510 may be directly fabricated together in a single operation. The positioner 500 may be fabricated using polymer material. The distalizer 510 may be attached to the positioner 500 via one or more breakable extensions 518 that extend between the integrated distalizer 510 and the positioner 500 across a gap 520 between the integrated distalizer 510 and the positioner 500.

The positioner 500 may include one or more tooth receiving cavities shaped according to shape of a patient's teeth. The positioner is shaped such that it may be fit on the patient's arch at a single location and orientation so as to place the distalizer 510 in an appropriate position according to a treatment plan for repositioning the patient's teeth.

The integrated distalizer 510 may be made of metal in order to impart the orthodontic tooth movement forces on the teeth while the positioner 500 and extensions 518 may be made from a polymer material for weight, cost savings, recyclability, and easy breakability of the extensions.

During use, the positioner 500 and distalizer 510 are directly fabricated in a single operation. The fabricated device is then placed on the patient's teeth and the distal end 512 and mesial end 514 of the distalizer 510 are attached to the patient's teeth. The extensions 518 may then be broken away from the distal end 512, the mesial end 514, and the shaft 516 of the distalizer and the positioner 500 may be removed from the patient's teeth. An elastic may then be attached to the mesial end 514 of the distalizer 510 to distalize the patient's teeth.

During distalization, the molar attached to the distal end 512 the distalizer is rotated about an axis. That axis of rotation may be based on the rotational axis of a hinge within the distal end 512 the distalizer.

By using direct fabrication and digital treatment planning tools distalizer 510 may be fabricated for a particular patient based on the patient's treatment plan and associated tooth movements. The direct fabrication of the distalizer 510 based on the patient's treatment plan may allow for customization of the rotational axis of the hinge in the distal end 512 of the distalizer 510.

In some embodiments the hinge in the distal end 512 of the distalizer 510 may be a ball and socket hinge with the ball directly fabricated within the socket of the hinge during the manufacturing process. A ball and socket hinge allows for rotation about multiple axes.

Figure 5B:
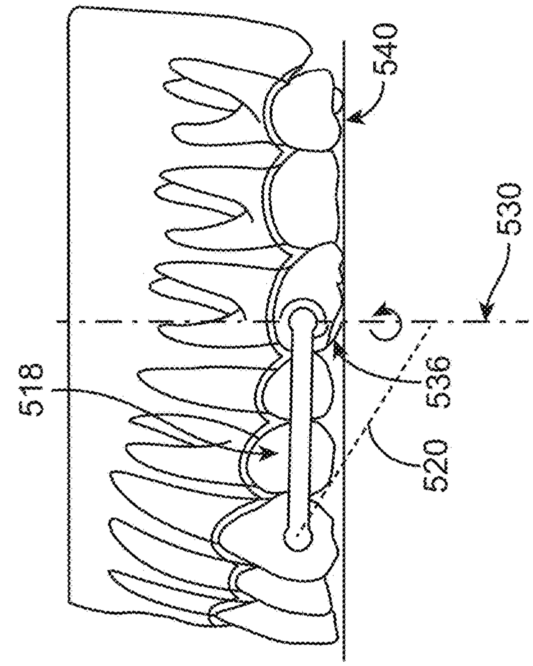
Figure 5C:
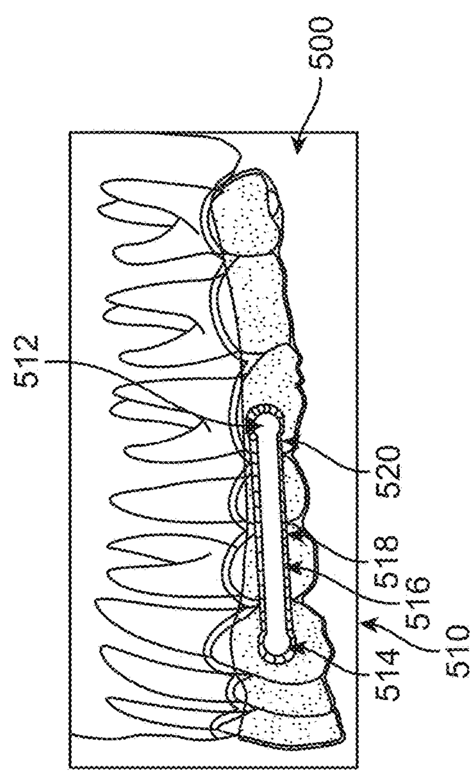
Figure 5D:
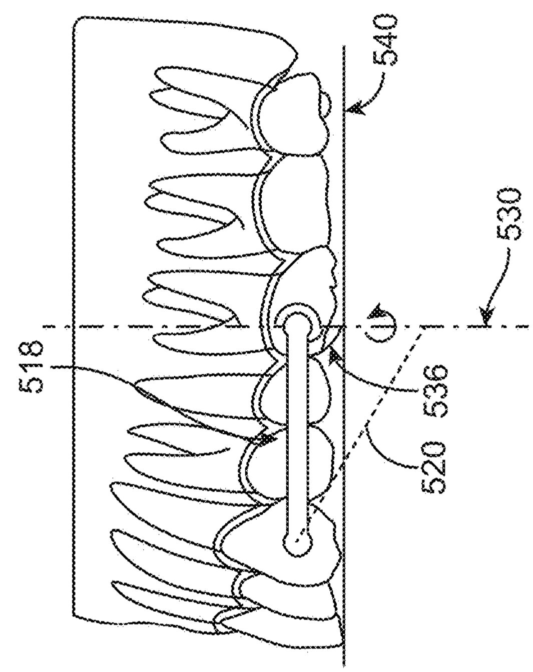

In some embodiments, the hinge may be single axis hinge, such as a pin and socket hinge, that rotates about a single axis defined by the axis of the pin and socket. In some embodiments, the axis may be perpendicular to the angle of the shaft 516 of the distalizer 510. In some embodiments, the angle of the axis may not be perpendicular to the angle of the shaft 516. The angle of the axis of the hinge of the distalizer 512 may change based on the relationship of the patient's teeth with an ideal occlusion. For example, as shown in FIGS. 5B, 5C, and 5D, the angle of the rotational axis 530 may change based on the angle of the shaft 518 with respect to the ideal occlusion 540. The shaft 518 is angled such that the distal end of the shaft is further away from the ideal occlusion than the mesial end of the shaft. In such an embodiment an angle 536 between the shaft and the rotational axis of the tooth may be an acute angle.

As shown in FIG. 5C, the shaft 518 is angled such that the distal end of the shaft is the same distance away from the ideal occlusion then the mesial end of the shaft. In such an embodiment, in angle 536 between the shaft and the rotational axis of the tooth may be a right angle.

As shown in FIG. 5D, the shaft 518 is angled such that the distal end of the shaft is closer to the ideal occlusion then the mesial end of the shaft. In such an embodiment, in angle 536 between the shaft and the rotational axis of the tooth may be an obtuse angle.

The angle 536 of the hinge in the distal end 512 of the respective distalizer 510 may match the angle of the shaft 518 of the distalizer 510 with respect to the ideal occlusion 540.

In some embodiments, the hinge axis may align with the molar axis of the molar to which the distal end of the distalizer is attached. In some embodiments, the treatment plan may include rotations of the molar about an axis other than the molar axis of the tooth.

Figure 6:
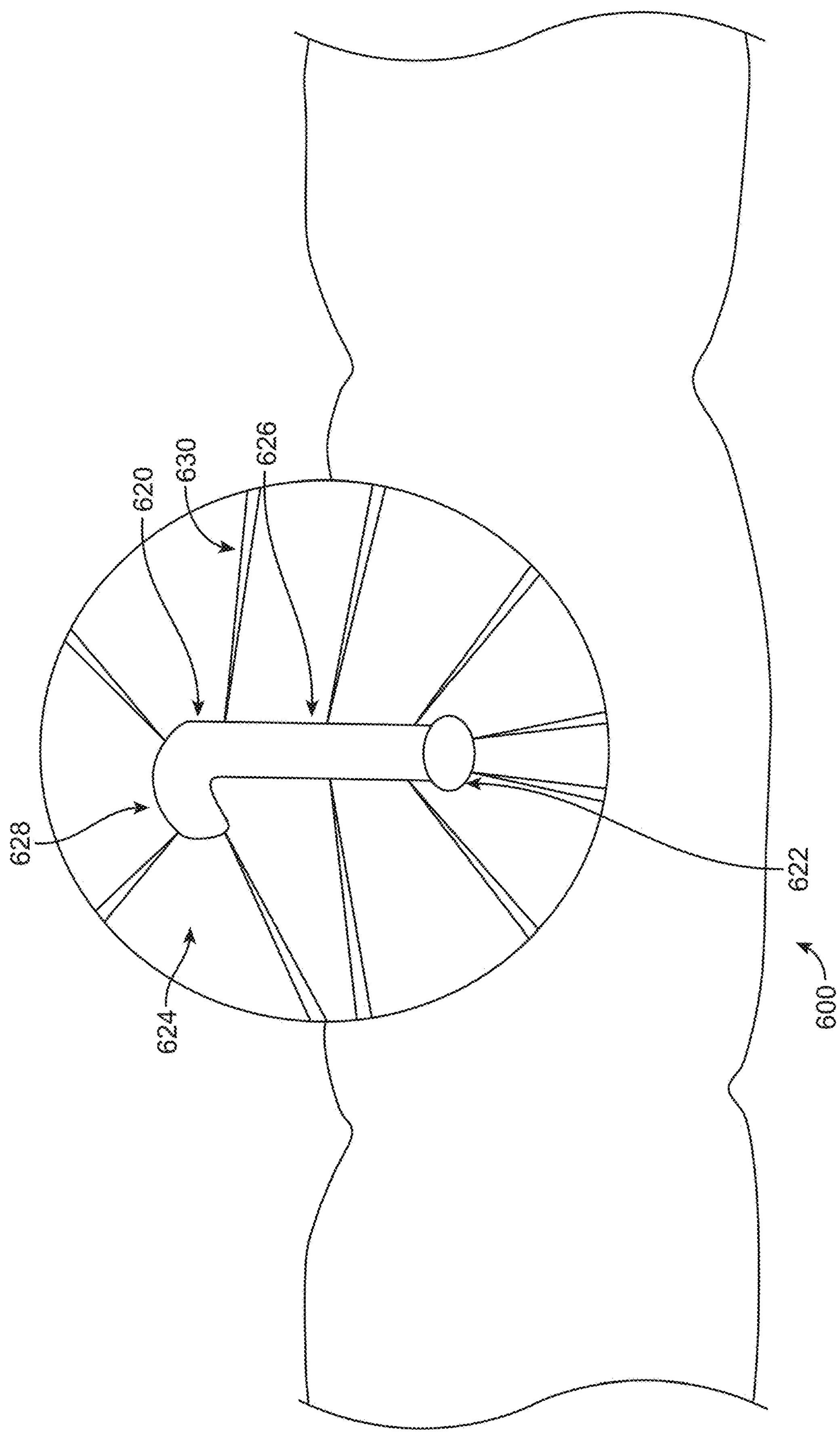
FIG. 6 shows a directly fabricated polymeric positioner with integrated metal power arm, in accordance with some embodiments.

FIG. 6 shows a directly fabricated polymeric positioner with an integrated metal power arm. A power arm 520 is an orthodontic attachment having a base 522 for attaching the power arm to a patient's tooth and a shaft 526 extending from the base to a hook 524. During use, an elastic is engaged within the hook 524 of the power arm 520 in order to apply a movement force onto a patient's tooth. Shaft 526 extends the location of the hook 524 to a sub gingival location on the patient's jaw allowing for application of forces the teeth that may not otherwise be available.

FIG. 6 shows a positioner 600 within integrated power arm 620. The positioner 600 and integrated power arm 620 may be directly fabricated together in a single operation. The power arm 620 may be fabricated in metal for mechanical strength in order to deliver the orthodontic movement force for moving the patient's teeth. The positioner 600 may be fabricated using polymer material. The power arm 620 may be attached to the positioner 600 via one or more breakable extensions 630 that extend between the integrated power arm 620 and the positioner 600 across a gap 628 between the integrated power arm 620 and the positioner 600.

The positioner 600 may include one or more tooth receiving cavities 632 shaped according to shape of a patient's teeth. The positioner 600 is shaped such that it may be fit on the patient's arch in a single location and orientation so as to place the power arm 620 in an appropriate position according to a treatment plan for repositioning the patient's teeth.

The integrated power arm 620 may be made of metal in order to impart the orthodontic tooth movement forces on the teeth while the positioner 600 and extensions 630 may be made from a polymer material for weight, cost savings, recyclability, and easy breakability of the extensions.

During use, the positioner 600 and power arm 620 are directly fabricated in a single operation. The fabricated device is then placed on the patient's teeth and the base 522 is attached to the patient's teeth. The extensions 518 may then be broken away from the hook 524, shaft 526, and base 522, and the positioner 600 may be removed from the patient's teeth. An elastic may then be attached to the hook 524 of the power arm 520 in order to apply a force to the patient's teeth.

By using direct fabrication and digital treatment planning tools, power arm 520 may be fabricated for a particular patient based on the patient's treatment plan and associated tooth movements. The direct fabrication of the power arm 520 based on the patient's treatment plan may allow for customization of the power arm and for accurate placement of the hook and forces applied to the patient's teeth.

Figure 7:
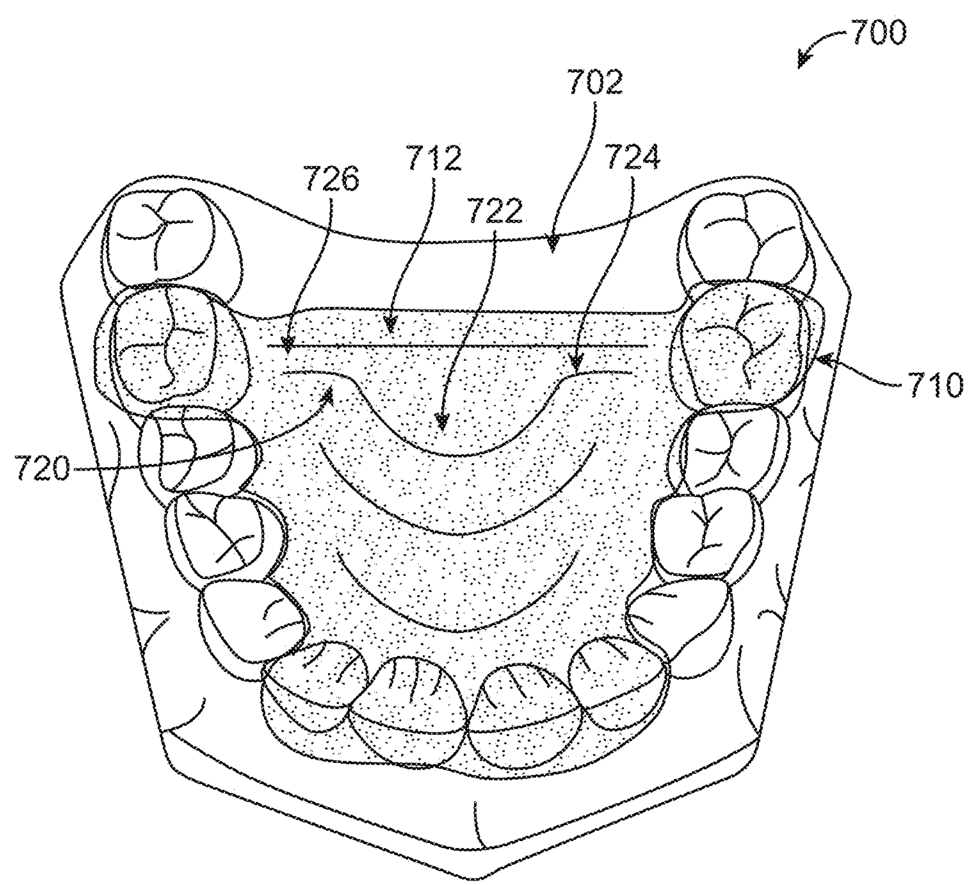
FIG. 7 shows a directly fabricated metal and polymer retainer with palatal coverage, in accordance with some embodiments.
Figure 8:
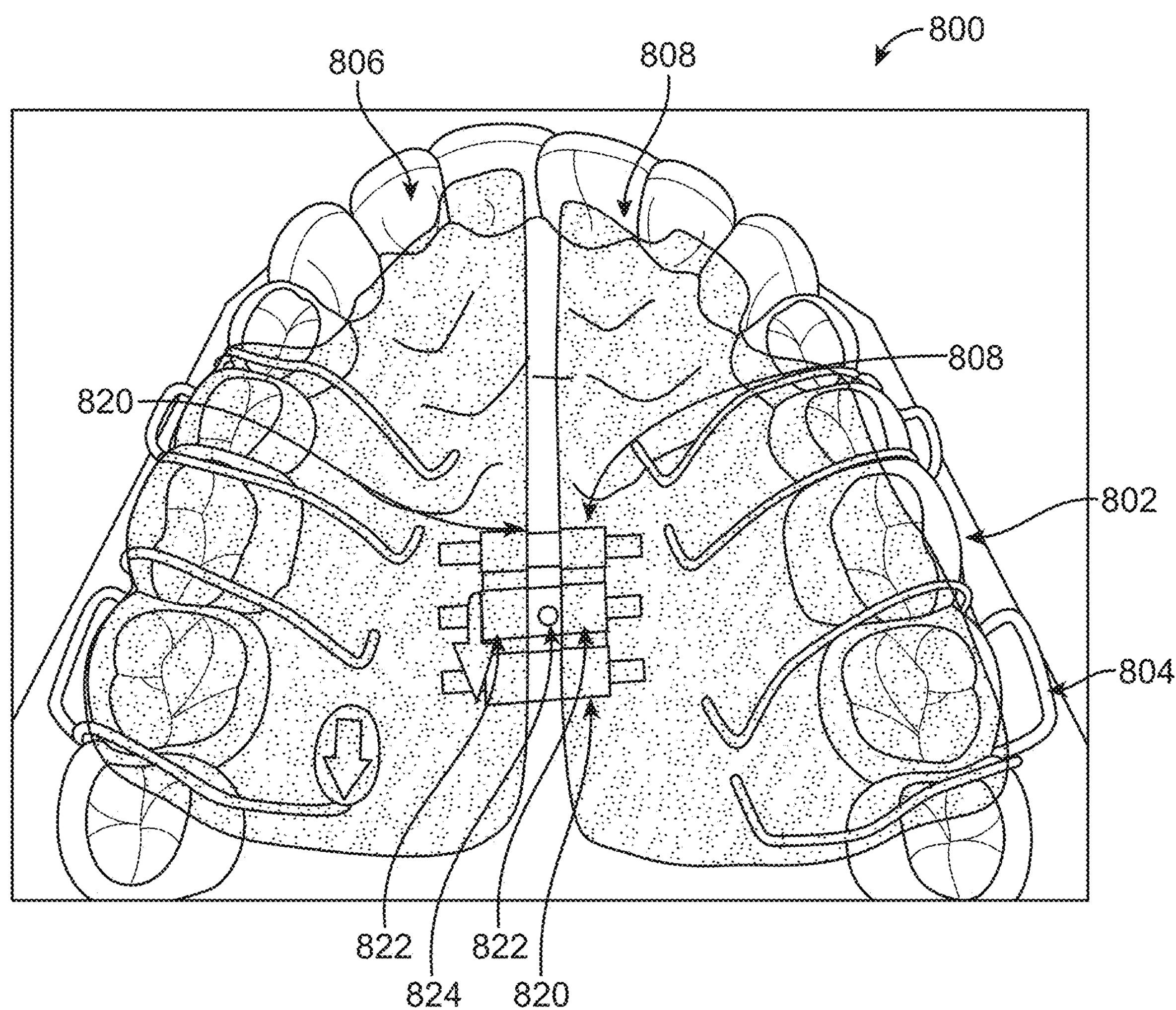
FIG. 8 shows a metal and polymer palatal expander with a directly fabricated adjustment device, in accordance with some embodiments.

FIGS. 7, 8, and 9 depict various embodiments of palatal orthodontic devices.

Figure 9A:
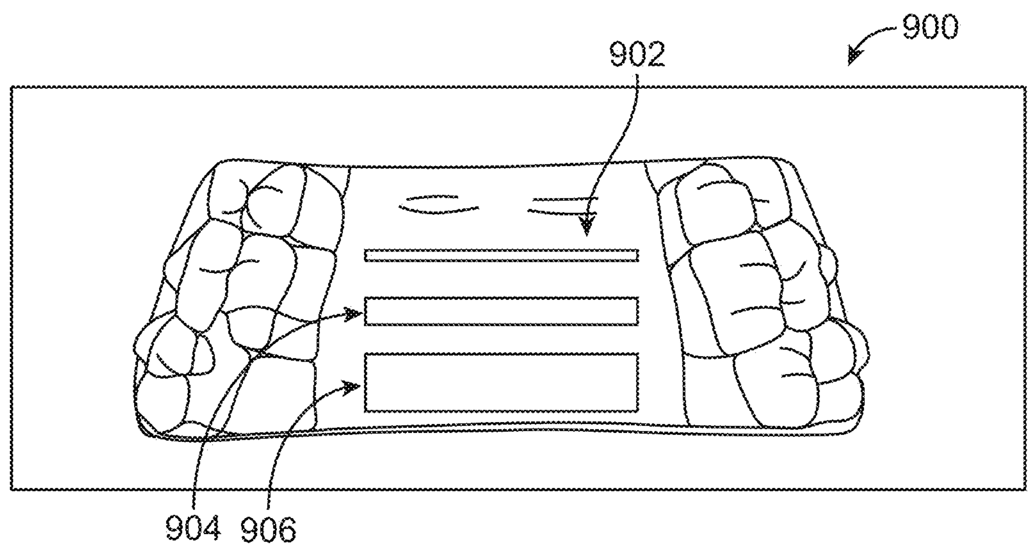
FIGS. 9A, 9B, and 9C show directly fabricated metal and polymer palatal expander's, in accordance with some embodiments.
Figure 9B:
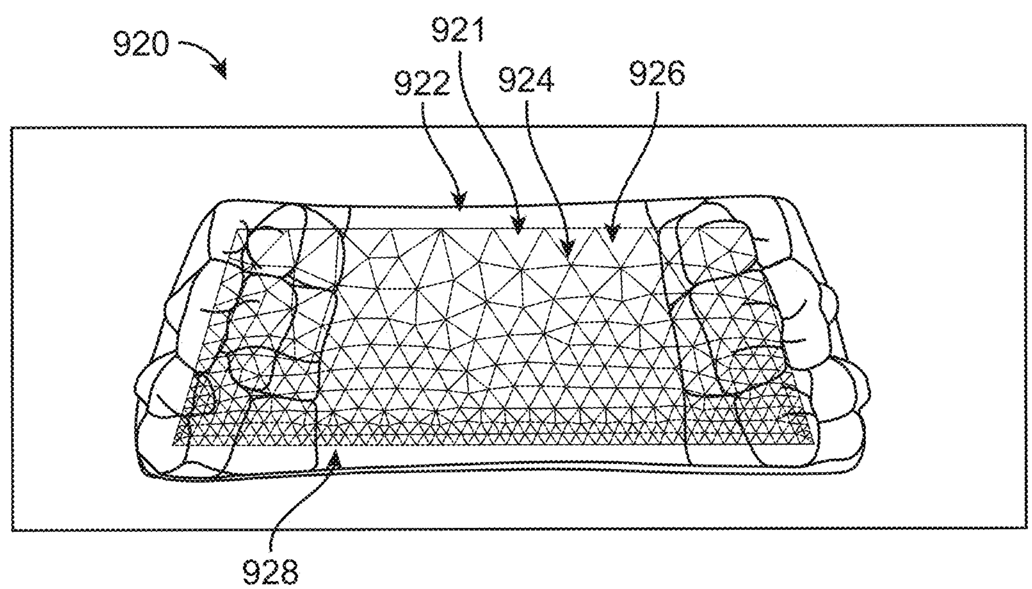
Figure 9C:
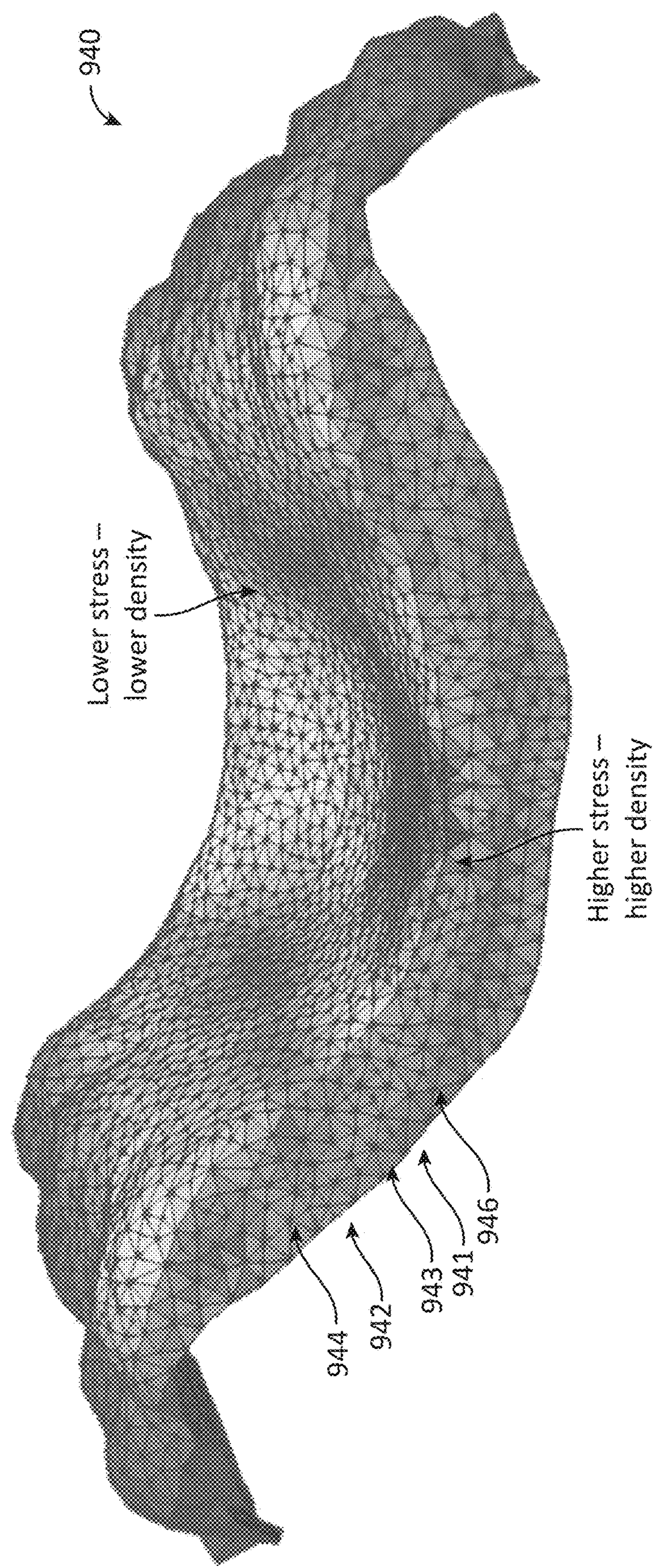

FIG. 7 shows a directly fabricated metal and polymer retainer with palatal coverage, FIG. 8 shows a metal and polymer palatal expander with a directly fabricated adjustment device, and FIGS. 9A, 9B, and 9C show directly fabricated metal and polymer palatal expanders.

With reference to FIG. 7, a directly fabricated metal and polymer retainer 700 with palatal coverage is shown. The metal and polymer retainer 700 may be directly fabricated in a single fabrication process. For example, the metal and polymer portions of the retainer 700 may be fabricated simultaneously or in a plurality of layers wherein polymer layers and metal layers are fabricated one after another during the single fabrication process. In some embodiments, a single directly fabricated layer may include both polymer portions and metal portions.

The directly fabricated metal and polymer retainer may include one or more tooth receiving cavities 710 for receiving the patient's teeth. For example, the polymer retainer 700 includes two tooth receiving cavities for anchoring molars and four tooth receiving cavities for anchoring the central and lateral incisors. The directly fabricated metal and polymer retainer may also include a palatal span 702 that covers the patient's palate and spans from the right side of the patient's arch to the left side of the patient's arch. The tooth receiving cavities and palatal span may be made from predominantly polymer material. The palatal span 702 may include metal reinforcements. For example, the palatal span 702 includes metal reinforcements 712 and 720. The metal reinforcements may be metal fibers or bars that extend across the patient's palate between the right side of the patient's arch and the left side of the patient's arch.

The thickness of the palatal span may be less than 1 mm. In some embodiments the thickness of the palatal span may be between 0.5 and 0.8 mm.

The fibers within the palatal span may have a diameter of between 20 μm and 800 μm. Preferably the fibers may have a diameter between 20 μm and 100 μm. In some embodiments, the fibers may have a diameter defined with respect to the thickness of the palatal span in which the fibers are placed. For example, the fibers may have a diameter of between 4% and 50% of the thickness of the palatal span, preferably between 4% and 25% of the thickness of the palatal span. In some embodiments, a length of the fiber may be between 10 and 100 times its diameter. In some embodiments, the diameter of the fiber may change along its length. For example, in some embodiments, the ends 724, 726 of the fibers may have a diameter that is less than the diameter of a middle portion 722 of the fiber. In some embodiments, the diameter of the fiber at a middle portion 722 of the fiber may be more than 50% greater than the diameter of the fiber at one or both of its ends 724, 726. In some embodiments, the diameter of the fiber at a middle portion 722 of the fiber may be more than 100%, 200%, or 300% greater than the diameter of the fiber at one or both of the ends 724, 726.

In some embodiments, the diameter of the fiber at a middle portion 722 of the fiber may be more than 50% greater than the diameter of the fiber at one or both of its ends 724, 726. In some embodiments, the diameter of the fiber at a middle portion 722 of the fiber may be more than 100%, 200%, or 300% greater than the diameter of the fiber at one or both of the ends 724, 726.

With reference to FIG. 8, a metal and polymer palatal expander with a directly fabricated adjustment device is shown. The metal and polymer palatal expander 800 may be directly fabricated in a single fabrication process. For example, the metal and polymer portions of the palatal expander 800 may be fabricated simultaneously or in a plurality of layers wherein polymer layers and metal layers are fabricated one after another during the single fabrication process. In some embodiments, a single directly fabricated layer may include both polymer portions and metal portions.

The directly fabricated metal and polymer palatal expander may be removably attached to the patient's teeth. The metal and polymer palatal expander 800 may include one or more dental portions 802 including metal reinforcements 804 for attaching the palatal expander 800 to the patient's teeth the palatal expander may include two polymer portions 806, 808 coupled together via an adjustment device 810.

The adjustment device 810 provides a means for pushing the first polymer portion 806 and the second polymer portion 808 of the palatal expander 800 away from each other to apply a force to the patient's arch, thereby expanding the patient's arch and palate. The adjustment device may include two adjustment guides 820. The adjustment guides may include hollow cylindrical shafts directly fabricated within each of the first and second portions 806, 808 and a shaft extending through the hollow cylindrical shafts. Such an arrangement provides for controlled and uniform expansion of the palatal expander.

The adjustment device 810 further includes two hollow or internally threaded shafts 822 each directly fabricated within a respective polymer portion 806, 808. The internal surface of the hollow threaded shafts are threaded with opposite thread directions. The adjustment device 810 also includes a threaded shaft 824 having two opposite ends, each end being treaded in one of the respective hollow shafts 822. The threads on the ends of the threaded shaft may also have opposite threads such that rotation of the threaded shaft 824 pushes the polymer portions 806, 808 away from each other.

The polymer portions 806, 808, the metal reinforcements 804, in the adjustment device 810 may be directly fabricated in a single fabrication process. For example, the polymer and metal portions may be fabricated layer by layer such that the metal portions of the adjustment device 810 a directly fabricated in or with the polymer portions 806, 808 as opposed to, for example forming the polymer portions around prefabricated metal adjustment portions.

With reference to FIGS. 9A, 9B, and 9C, directly fabricated metal and polymer palatal expanders are shown. FIG. 9A depicts directly fabricated metal reinforcements 902, 904, 906 within a polymer palatal expander 900. Palatal expanders, such as palatal expander 900, exert a palatal expansion force on the arches and palate of a patient in order to increase the size of the palate and the arch of the patient. Increasing the size of the pallet and arch of the patient provides more room for the movement and positioning of the patient's teeth to alleviate crowding and other orthodontic issues.

The forces exerted by a palatal expander increase from the anterior portion of the arch towards the posterior portion of the arch. In a pure polymer palatal expander, a thickness of the palatal expander may also increase from the anterior portion of the palatal expander towards the posterior portion of the palatal expander. In some cases, the thickness may increase to a point where it interferes with the patient's daily activities such as speaking and eating which may lead to a patient compliance issues and delayed or failed treatments.

Reinforcing polymer palatal expander with metal or other stiff materials may allow for a uniform thickness across the palatal expander or a reduced thickness as compared to an aligner exerting similar forces without metal reinforcements. As shown in FIG. 9A, metal reinforcements 902, 904, 906 with varying widths and thicknesses may be used to add additional strength and rigidity to the palatal expander. The thickness and/or width of the metal reinforcements may increase based on the relative posterior position of the directly fabricated metal reinforcement. A first of the metal reinforcements 902 may be located anteriorly of other metal reinforcements and may be thinner than the other metal reinforcements 904, 906 in one or more of thickness and width. A second of the metal reinforcements 904 may be thinner than metal reinforcement 906 and one or more of thickness and width while being thicker than metal reinforcement 902 and one or more of thickness and width. In some embodiments, a third metal reinforcement 906, located posteriorly of the other metal reinforcements 902, 904 may be thicker than the other metal reinforcements 902, 904 and one or more of thickness and width.

Through the use of digital treatment planning, the desired forces applied by the palatal expander 900 to the patient's dentition may be modeled. The location and size of the directly fabricated reinforcements 902, 904, 906 may be determined based on the modeled forces. In some embodiments, palatal expanders for patients with steep or wide arches may include more embedded metal reinforcements than palatal expanders for patients with narrow and shallow arches.

FIG. 9B depicts a metal reinforced palatal expander 920 with a metal lattice reinforcement structure 922. A two-dimensional metal lattice structure may include a plurality of two-dimensional polygons formed from three or more edges 926 joined at three or more vertices 924. For example, the two-dimensional metal lattice 922 includes a plurality of triangular lattice elements 921 each having three edges 926 and three vertices 924. Each vertex 924 within the interior of the mesh connects to six edges of six adjacent triangular lattice elements 924. Each edge of each triangular element is shared with an adjacent triangular element.

The density of the triangular lattice elements 921 of the two-dimensional metal lattice may vary at different locations based on the anticipated loads to be experienced by the palatal expander 920 at a particular location. For example, the lattice density in the posterior portion 928 of the palatal expander 920 is greater than the lattice density at an anterior portion of the palatal expander 920. Lattice density may be expressed as a number of lattice elements per unit area or as a volume fraction or area fraction of metal per unit area or unit volume of the palatal expander. The lattice density may increase by a factor of 2, 3, 5, 10, or more from an anterior edge of the palatal expander 920 as compared to a posterior edge of the palatal expander 920. In some embodiments, the lattice density may vary based on the strain experienced by the palatal expander. For example, in some embodiments, the lattice density may be greater in areas of expected increased strain as compared to the lattice density in areas of lower strain.

FIG. 9C depicts a metal reinforced palatal expander 940 with a three-dimensional metal lattice reinforcement structure 942. A three-dimensional metal lattice structure may include a plurality of two-dimensional polygons formed from three or more edges 926 joined at three or more vertices 944 to make a plurality of tetrahedrons. For example, the three-dimensional metal lattice 942 includes a plurality of pyramid lattice elements 941 each having four triangular faces formed from three edges 946 and three vertices 924. Each vertex 924 within the interior of the mesh connects to at least six adjacent tetrahedrons lattice elements 944. Each edge of each tetrahedron element is shared with at least two adjacent tetrahedron elements.

The density of the tetrahedron lattice elements 941 of the three-dimensional metal lattice may vary at different locations based on the anticipated loads to be experienced by the palatal expander 940 at a particular location. For example, in some embodiments, the lattice density may be greater in areas of expected increased strain as compared to the lattice density in areas of lower strain. Lattice density may be expressed as a number of tetrahedron lattice elements per unit volume or as a volume fraction of metal per unit area or unit volume of the palatal expander. The lattice density may increase by a factor of 2, 3, 5, 10, or more from an anterior edge of the palatal expander 920 as compared to a posterior edge of the palatal expander 920. In some embodiments, the lattice density may vary based on the strain experienced by the palatal expander in a particular location.

The elements of a two or three-dimensional lattice may have a diameter of between 20 μm and 1000 μm. Preferably the elements may have a diameter between 20 μm and 100 μm. In some embodiments, the elements may have a diameter defined with respect to the thickness of the aligner wall in which the elements are placed. For example, the elements may have a diameter of between 4% and 50% of the aligner thickness, preferably between 4% and 25% of the thickness of the aligner. In some embodiments, a length of the elements may be between 10 and 100 times its diameter.

In some embodiments, the diameter of the elements may change along its length. For example, in some embodiments, the ends of the elements at vertices may have a diameter that is less than the diameter of a middle portion of the elements. In some embodiments, the diameter of the elements at a middle portion of the elements may be more than 50% greater than the diameter of the elements at one or both of its ends. In some embodiments, the diameter of the elements at a middle portion of the elements may be more than 100%, 200%, or 300% greater than the diameter of the elements at one or both of the ends.

In some embodiments, the diameter of the elements may change along its length. For example, in some embodiments, the ends of the elements at vertices may have a diameter that is greater than the diameter of a middle portion of the elements. In some embodiments, the diameter of the elements at a ends of the elements may be more than 50% greater than the diameter of the elements at its middle. In some embodiments, the diameter of the elements at a ends of the elements may be more than 100%, 200%, or 300% greater than the diameter of the elements at its middle.

The configuration of the orthodontic appliances herein can be determined according to a treatment plan for a patient, e.g., a treatment plan involving successive administration of a plurality of appliances for incrementally repositioning teeth. Computer-based treatment planning and/or appliance manufacturing methods can be used in order to facilitate the design and fabrication of appliances. For instance, one or more of the appliance components described herein can be digitally designed and fabricated with the aid of computer-controlled manufacturing devices (e.g., computer numerical control (CNC) milling, computer-controlled additive manufacturing such as 3D printing, etc.). The computer-based methods presented herein can improve the accuracy, flexibility, and convenience of appliance fabrication.

In some embodiments, computer-based 3-dimensional planning/design tools, such as Treat™ software from Align Technology. Inc., may be used to design and fabricate the orthodontic appliances described herein.

Figure 10:
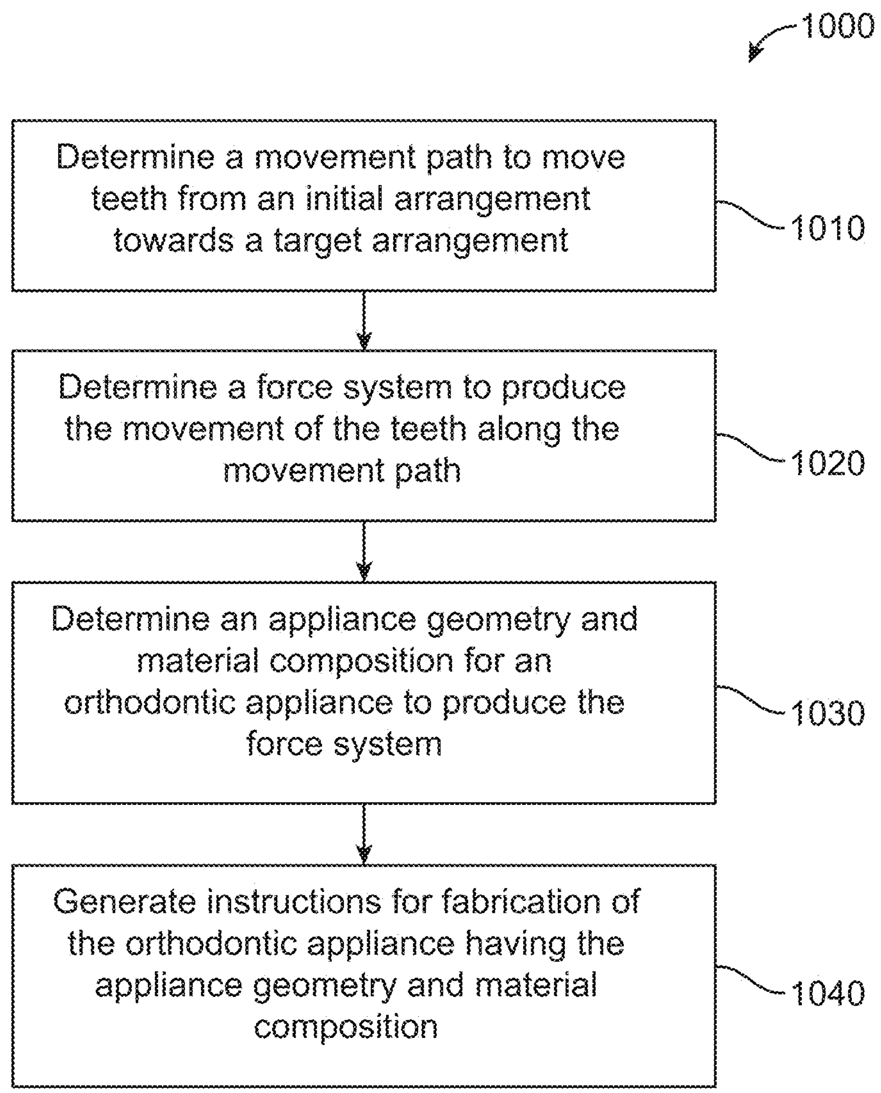
FIG. 10 show illustrates a method for designing directly fabricated metal and polymer orthodontic appliance, in accordance with some embodiments.

FIG. 10 illustrates a method 1000 for designing an orthodontic appliance to be produced by direct fabrication, in accordance with embodiments. The method 1000 can be applied to any embodiment of the orthodontic appliances described herein. Some or all of the steps of the method 1000 can be performed by any suitable data processing system or device, e.g., one or more processors configured with suitable instructions.

In step 1010, a movement path to move one or more teeth from an initial arrangement to a target arrangement is determined. The initial arrangement can be determined from a mold or a scan of the patient's teeth or mouth tissue, e.g., using wax bites, direct contact scanning, x-ray imaging, tomographic imaging, sonographic imaging, and other techniques for obtaining information about the position and structure of the teeth, jaws, gums and other orthodontically relevant tissue. From the obtained data, a digital data set can be derived that represents the initial (e.g., pretreatment) arrangement of the patient's teeth and other tissues. Optionally, the initial digital data set is processed to segment the tissue constituents from each other. For example, data structures that digitally represent individual tooth crowns can be produced. Advantageously, digital models of entire teeth can be produced, including measured or extrapolated hidden surfaces and root structures, as well as surrounding bone and soft tissue.

The target arrangement of the teeth (e.g., a desired and intended end result of orthodontic treatment) can be received from a clinician in the form of a prescription, can be calculated from basic orthodontic principles, and/or can be extrapolated computationally from a clinical prescription. With a specification of the desired final positions of the teeth and a digital representation of the teeth themselves, the final position and surface geometry of each tooth can be specified to form a complete model of the tooth arrangement at the desired end of treatment.

Having both an initial position and a target position for each tooth, a movement path can be defined for the motion of each tooth. In some embodiments, the movement paths are configured to move the teeth in the quickest fashion with the least amount of round-tripping to bring the teeth from their initial positions to their desired target positions. The tooth paths can optionally be segmented, and the segments can be calculated so that each tooth's motion within a segment stays within threshold limits of linear and rotational translation. In this way, the end points of each path segment can constitute a clinically viable repositioning, and the aggregate of segment end points can constitute a clinically viable sequence of tooth positions, so that moving from one point to the next in the sequence does not result in a collision of teeth.

In step 1020, a force system to produce movement of the one or more teeth along the movement path is determined. A force system can include one or more forces and/or one or more torques. Different force systems can result in different types of tooth movement, such as tipping, translation, rotation, extrusion, intrusion, root movement, etc. Biomechanical principles, modeling techniques, force calculation/measurement techniques, and the like, including knowledge and approaches commonly used in orthodontia, may be used to determine the appropriate force system to be applied to the tooth to accomplish the tooth movement. In determining the force system to be applied, sources may be considered including literature, force systems determined by experimentation or virtual modeling, computer-based modeling, clinical experience, minimization of unwanted forces, etc.

Determination of the force system can be performed in a variety of ways. For example, in some embodiments, the force system is determined on a patient-by-patient basis, e.g., using patient-specific data. Alternatively or in combination, the force system can be determined based on a generalized model of tooth movement (e.g., based on experimentation, modeling, clinical data, etc.), such that patient-specific data is not necessarily used. In some embodiments, determination of a force system involves calculating specific force values to be applied to one or more teeth to produce a particular movement. Alternatively, determination of a force system can be performed at a high level without calculating specific force values for the teeth. For instance, step 1020 can involve determining a particular type of force to be applied (e.g., extrusive force, intrusive force, translational force, rotational force, tipping force, torquing force, etc.) without calculating the specific magnitude and/or direction of the force.

In step 1030, an appliance geometry and/or material composition for an orthodontic appliance configured to produce the force system is determined. The appliance can be any embodiment of the appliances discussed herein, such as an appliance having variable localized properties, integrally formed components, and/or power arms.

For example, in some embodiments, the appliance comprises a heterogeneous thickness, a heterogeneous stiffness, or a heterogeneous material composition. In some embodiments, the appliance comprises two or more of a heterogeneous thickness, a heterogeneous stiffness, or a heterogeneous material composition. In some embodiments, the appliance comprises a heterogeneous thickness, a heterogeneous stiffness, and a heterogeneous material composition. The heterogeneous thickness, stiffness, and/or material composition can be configured to produce the force system for moving the teeth, e.g., by preferentially applying forces at certain locations on the teeth. For example, an appliance with heterogeneous thickness can include thicker portions that apply more force on the teeth than thinner portions. As another example, an appliance with heterogeneous stiffness can include stiffer portions that apply more force on the teeth than more elastic portions. Variations in stiffness can be achieved by varying the appliance thickness, material composition, and/or degree of photopolymerization, as described herein.

In some embodiments, determining the appliance geometry and/or material composition comprises determining the geometry and/or material composition of one or more integrally formed components to be directly fabricated with an appliance shell. The integrally formed component can be any of the embodiments described herein. The geometry and/or material composition of the integrally formed component(s) can be selected to facilitate application of the force system onto the patient's teeth. The material composition of the integrally formed component can be the same as or different from the material composition of the shell.

In some embodiments, determining the appliance geometry and/or material composition comprises determining the geometry and/or material composition for a power arm design for the orthodontic appliance. The power arm design can utilize any of the power arm embodiments described herein. The power arm design can be configured to produce the force system is determined. Determination of the power arm design, appliance geometry, material composition, and/or properties can be performed using a treatment or force application simulation environment.

The step 1030 can involve analyzing the desired force system in order to determine an appliance geometry and material composition that would produce the force system. In some embodiments, the analysis involves determining appliance properties (e.g., stiffness) at one or more locations that would produce a desired force at the one or more locations. The analysis can then involve determining an appliance geometry and material composition at the one or more locations to achieve the specified properties. Determination of the appliance geometry and material composition can be performed using a treatment or force application simulation environment. A simulation environment can include, e.g., computer modeling systems, biomechanical systems or apparatus, and the like. Optionally, digital models of the appliance and/or teeth can be produced, such as finite element models. The finite element models can be created using computer program application software available from a variety of vendors. For creating solid geometry models, computer aided engineering (CAE) or computer aided design (CAD) programs can be used, such as the AutoCAD® software products available from Autodesk, Inc., of San Rafael, Calif. For creating finite element models and analyzing them, program products from a number of vendors can be used, including finite element analysis packages from ANSYS, Inc., of Canonsburg, Pa., and SIMULIA (Abaqus) software products from Dassault Systémes of Waltham, Mass.

Optionally, one or more appliance geometries and material compositions can be selected for testing or force modeling. As noted above, a desired tooth movement, as well as a force system required or desired for eliciting the desired tooth movement, can be identified. Using the simulation environment, a candidate appliance geometry and composition can be analyzed or modeled for determination of an actual force system resulting from use of the candidate appliance. One or more modifications can optionally be made to a candidate appliance, and force modeling can be further analyzed as described, e.g., in order to iteratively determine an appliance design that produces the desired force system.

Optionally, step 1030 can further involve determining the geometry of one or more auxiliary components to be used in combination with the orthodontic appliance in order to exert the force system on the one or more teeth. Such auxiliaries can include one or more of tooth-mounted attachments, elastics, wires, springs, bite blocks, arch expanders, wire-and-bracket appliances, shell appliances, headgear, or any other orthodontic device or system that can be used in conjunction with the orthodontic appliances herein. The use of such auxiliary components may be advantageous in situations where it is difficult for the appliance alone to produce the force system. Additionally, auxiliary components can be added to the orthodontic appliance in order to provide other desired functionalities besides producing the force system, such as mandibular advancement splints to treat sleep apnea, pontics to improve aesthetic appearance, and so on. In some embodiments, the auxiliary components are fabricated and provided separately from the orthodontic appliance. Alternatively, the geometry of the orthodontic appliance can be modified to include one or more auxiliary components as integrally formed components.

In some embodiments, at block 1030, an analysis of the aligner structure may be performed. Analysis may include a finite element analysis or other analysis. In some embodiments, a surrogate model may be used to analyze the stiffness of the aligner, the deformation of the aligner when worn, and the aligner's ability to exert the desired forces on the patient's dentition. The analysis may determine the stiffness at one or more locations on the aligner, the deformation of the aligner in one or more locations, and the force imparted on the aligner at one or more locations. If one or more locations exceeds a threshold of deformation, fails to meet a threshold of stiffness, or fails to impart a threshold of force, then stiffeners may be added to the aligner at such locations, as described herein. In some embodiments, the force may be based on a desired force determined during generation of the treatment plan to move a tooth from a first location to a second location, or to advance the jaw, or for other orthodontic treatment.

In step 1040, instructions for fabrication of the orthodontic appliance having the appliance geometry and material composition are generated. The instructions can be configured to control a fabrication system or device in order to produce the orthodontic appliance with the specified appliance geometry and material composition. In some embodiments, the instructions are configured for manufacturing the orthodontic appliance using direct fabrication (e.g., stereolithography, selective laser sintering, fused deposition modeling, 3D printing, continuous direct fabrication, multi-material direct fabrication, etc.), in accordance with the various methods presented herein. Optionally, the instructions can be configured to cause a fabrication machine to directly fabricate the orthodontic appliance with variable properties, integrally formed components and/or power arms, as discussed above and herein. In alternative embodiments, the instructions can be configured for indirect fabrication of the appliance, e.g., by thermoforming.

Although the above steps show a method 1000 of designing an orthodontic appliance in accordance with some embodiments, a person of ordinary skill in the art will recognize some variations based on the teaching described herein. Some of the steps may comprise sub-steps. Some of the steps may be repeated as often as desired. One or more steps of the method 200 may be performed with any suitable fabrication system or device, such as the embodiments described herein. Some of the steps may be optional, and the order of the steps can be varied as desired. For instance, in some embodiments, step 1020 is optional, such that step 1030 involves determining the appliance geometry and/or material composition based directly on the tooth movement path rather than based on the force system.

Figure 11:
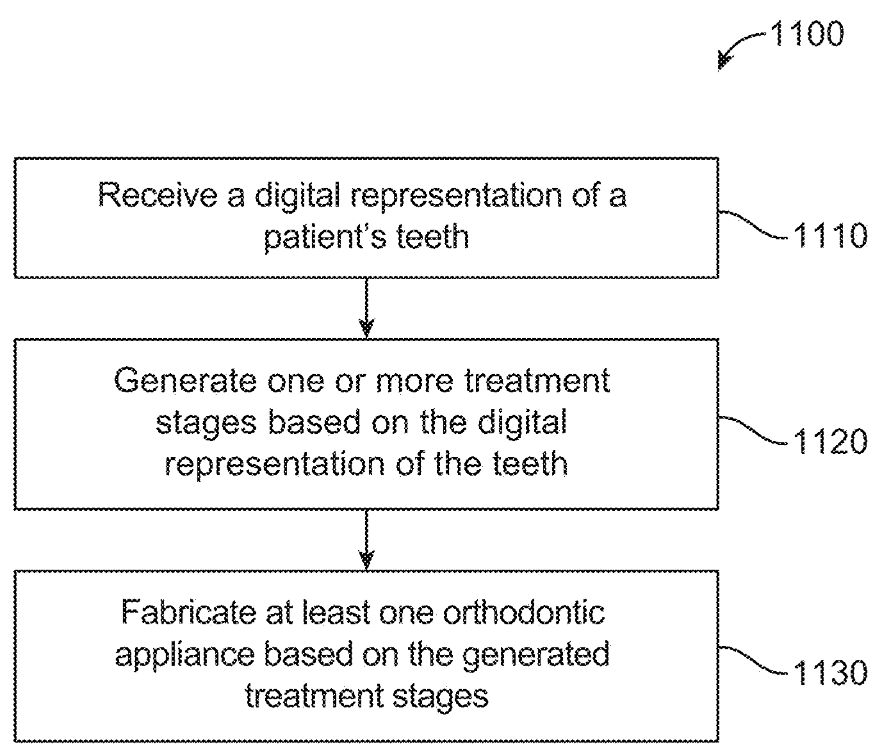
FIG. 11 show a method for digitally planning an orthodontic treatment, in accordance with some embodiments.

FIG. 11 illustrates a method 1100 for digitally planning an orthodontic treatment and/or design or fabrication of an appliance, in accordance with embodiments. The method 1100 can be applied to any of the treatment procedures described herein and can be performed by any suitable data processing system.

In step 1110, a digital representation of a patient's teeth is received. The digital representation can include surface topography data for the patient's intraoral cavity (including teeth, gingival tissues, etc.). The surface topography data can be generated by directly scanning the intraoral cavity, a physical model (positive or negative) of the intraoral cavity, or an impression of the intraoral cavity, using a suitable scanning device (e.g., a handheld scanner, desktop scanner, etc.).

In step 1120, one or more treatment stages are generated based on the digital representation of the teeth. The treatment stages can be incremental repositioning stages of an orthodontic treatment procedure designed to move one or more of the patient's teeth from an initial tooth arrangement to a target arrangement. For example, the treatment stages can be generated by determining the initial tooth arrangement indicated by the digital representation, determining a target tooth arrangement, and determining movement paths of one or more teeth in the initial arrangement necessary to achieve the target tooth arrangement. The movement path can be optimized based on minimizing the total distance moved, preventing collisions between teeth, avoiding tooth movements that are more difficult to achieve, or any other suitable criteria.

In step 1130, at least one orthodontic appliance is fabricated based on the generated treatment stages. For example, a set of appliances can be fabricated, each shaped according a tooth arrangement specified by one of the treatment stages, such that the appliances can be sequentially worn by the patient to incrementally reposition the teeth from the initial arrangement to the target arrangement. The appliance set may include one or more of the orthodontic appliances described herein. The fabrication of the appliance may involve creating a digital model of the appliance to be used as input to a computer-controlled fabrication system. The appliance can be formed using direct fabrication methods, indirect fabrication methods, or combinations thereof, as desired.

In some instances, staging of various arrangements or treatment stages may not be necessary for design and/or fabrication of an appliance. As illustrated by the dashed line in FIG. 11, design and/or fabrication of an orthodontic appliance, and perhaps a particular orthodontic treatment, may include use of a representation of the patient's teeth (e.g., receive a digital representation of the patient's teeth 1110), followed by design and/or fabrication of an orthodontic appliance based on a representation of the patient's teeth in the arrangement represented by the received representation.

Optionally, some or all of the steps of the method 1100 are performed locally at the site where the patient is being treated and during a single patient visit, referred to herein as "chair side manufacturing." Chair side manufacturing can involve, for example, scanning the patient's teeth, automatically generating a treatment plan with treatment stages, and immediately fabricating one or more orthodontic appliance (s) to treat the patient using a chair side direct fabrication machine, all at the treating professional's office during a single appointment. In embodiments where a series of appliances are used to treat the patient, the first appliance may be produced chair side for immediate delivery to the patient, with the remaining appliances produced separately (e.g., off site at a lab or central manufacturing facility) and delivered at a later time (e.g., at a follow up appointment, mailed to the patient). Alternatively, the methods herein can accommodate production and immediate delivery of the entire series of appliances on site during a single visit. Chair side manufacturing can thus improve the convenience and speed of the treatment procedure by allowing the patient to immediately begin treatment at the practitioner's office, rather than having to wait for fabrication and delivery of the appliances at a later date. Additionally, chair side manufacturing can provide improved flexibility and efficiency of orthodontic treatment. For instance, in some embodiments, the patient is re-scanned at each appointment to determine the actual positions of the teeth, and the treatment plan is updated accordingly. Subsequently, new appliances can be immediately produced and delivered chair side to accommodate any changes to or deviations from the treatment plan.

Figure 12:
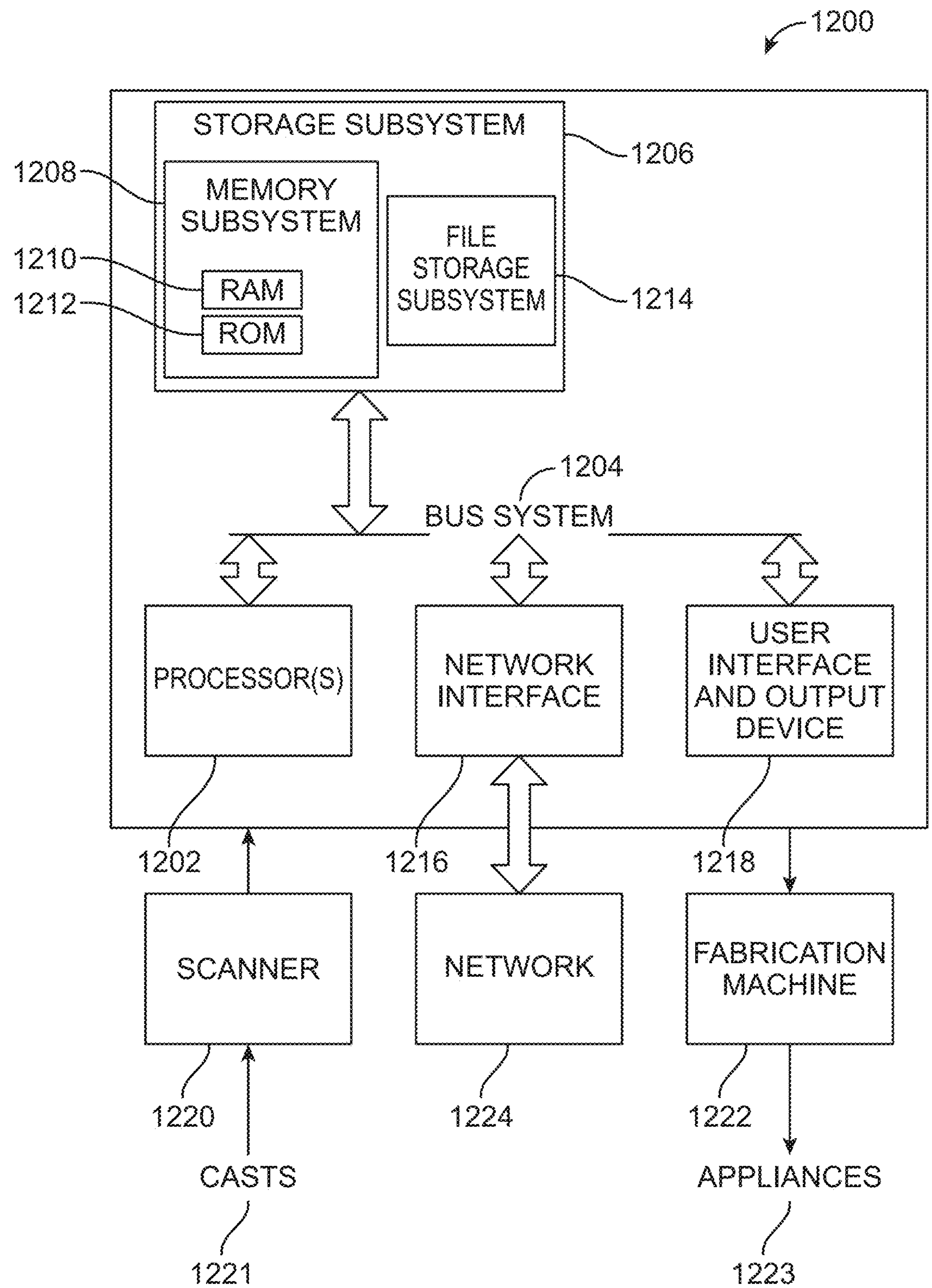
FIG. 12 show a simplified block diagram of a data processing system, in accordance with some embodiments.

FIG. 12 is a simplified block diagram of a data processing system 1200 that may be used in executing methods and processes described herein. The data processing system 1200 typically includes at least one processor 1202 that communicates with one or more peripheral devices via bus subsystem 1204. These peripheral devices typically include a storage subsystem 1206 (memory subsystem 1208 and file storage subsystem 1214), a set of user interface input and output devices 1218, and an interface to outside networks 1216. This interface is shown schematically as "Network Interface" block 1216, and is coupled to corresponding interface devices in other data processing systems via communication network interface 1224. Data processing system 1200 can include, for example, one or more computers, such as a personal computer, workstation, mainframe, laptop, and the like.

The user interface input devices 1218 are not limited to any particular device, and can typically include, for example, a keyboard, pointing device, mouse, scanner, interactive displays, touchpad, joysticks, etc. Similarly, various user interface output devices can be employed in a system of the invention, and can include, for example, one or more of a printer, display (e.g., visual, non-visual) system/subsystem, controller, projection device, audio output, and the like.

Storage subsystem 1206 maintains the basic required programming, including computer readable media having instructions (e.g., operating instructions, etc.), and data constructs. The program modules discussed herein are typically stored in storage subsystem 1206. Storage subsystem 1206 typically includes memory subsystem 1208 and file storage subsystem 1214. Memory subsystem 1208 typically includes a number of memories (e.g., RAM 1210, ROM 1212, etc.) including computer readable memory for storage of fixed instructions, instructions and data during program execution, basic input/output system, etc. File storage subsystem 1214 provides persistent (non-volatile) storage for program and data files, and can include one or more removable or fixed drives or media, hard disk, floppy disk, CD-ROM, DVD, optical drives, and the like. One or more of the storage systems, drives, etc may be located at a remote location, such coupled via a server on a network or via the internet/World Wide Web. In this context, the term "bus subsystem" is used generically so as to include any mechanism for letting the various components and subsystems communicate with each other as intended and can include a variety of suitable components/systems that would be known or recognized as suitable for use therein. It will be recognized that various components of the system can be, but need not necessarily be at the same physical location, but could be connected via various local-area or wide-area network media, transmission systems, etc.

Scanner 1220 includes any means for obtaining a digital representation (e.g., images, surface topography data, etc.) of a patient's teeth (e.g., by scanning physical models of the teeth such as casts 1221, by scanning impressions taken of the teeth, or by directly scanning the intraoral cavity), which can be obtained either from the patient or from treating professional, such as an orthodontist, and includes means of providing the digital representation to data processing system 1200 for further processing. Scanner 1220 may be located at a location remote with respect to other components of the system and can communicate image data and/or information to data processing system 1200, for example, via a network interface 1224. Fabrication system 1222 fabricates appliances 1223 based on a treatment plan, including data set information received from data processing system 1200. Fabrication machine 1222 can, for example, be located at a remote location and receive data set information from data processing system 1200 via network interface 1224.

The data processing aspects of the methods described herein can be implemented in digital electronic circuitry, or in computer hardware, firmware, software, or suitable combinations thereof. Data processing apparatus can be implemented in a computer program product tangibly embodied in a machine-readable storage device for execution by a programmable processor. Data processing steps can be performed by a programmable processor executing program instructions to perform functions by operating on input data and generating output. The data processing aspects can be implemented in one or more computer programs that are executable on a programmable system, the system including one or more programmable processors operably coupled to a data storage system. Generally, a processor will receive instructions and data from a read-only memory and/or a random access memory. Storage devices suitable for tangibly embodying computer program instructions and data include all forms of nonvolatile memory, such as: semiconductor memory devices, such as EPROM, EEPROM, and flash memory devices; magnetic disks such as internal hard disks and removable disks; magneto-optical disks; and CD-ROM disks.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

The processor as described herein can be configured to perform one or more steps of any method disclosed herein. Alternatively or in combination, the processor can be configured to combine one or more steps of one or more methods as disclosed herein.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and shall have the same meaning as the word "comprising."

The processor as disclosed herein can be configured with instructions to perform any one or more steps of any method as disclosed herein.

It will be understood that although the terms "first," "second," "third", etc. may be used herein to describe various layers, elements, components, regions or sections without referring to any particular order or sequence of events. These terms are merely used to distinguish one layer, element, component, region or section from another layer, element, component, region or section. A first layer, element, component, region or section as described herein could be referred to as a second layer, element, component, region or section without departing from the teachings of the present disclosure.

As used herein, the term "or" is used inclusively to refer items in the alternative and in combination.

As used herein, characters such as numerals refer to like elements.

The present disclosure includes the following numbered clauses.

Clause 1. A method of directly fabricating an orthodontic device, the method comprising: directly fabricating tooth receiving cavities of an orthodontic device, the tooth receiving cavities including at least one sidewall and being fabricated of a first material; and directly fabricating a reinforcement member within the at least one sidewall, wherein the reinforcement members are fabricated of a second material, different than the first material.

Clause 2. The method of clause 1, wherein: directly fabricating the tooth receiving cavies occurs at the same time as directly fabricating the reinforcement member.

Clause 3. The method of clause 1, wherein the first material comprises a polymer.

Clause 4. The method of clause 3, wherein the second material comprises a metal.

Clause 5. The method of clause 1, wherein directly fabricating the reinforcement member within the at least one sidewall includes: fabricating the reinforcement member to extend from a first end to a second end along a mesial-distal direction of the orthodontic device.

Clause 6. The method of clause 5, wherein: the first end is within a sidewall of a first of the tooth receiving cavities and the second end is withing a sidewall of a second tooth receiving cavity.

Clause 7. The method of clause 6, wherein: the first tooth receiving cavity and the second tooth receiving cavity are adjacent.

Clause 8. The method of clause 6, wherein: the first tooth receiving cavity and the second tooth receiving cavity are not adjacent.

Clause 9. The method of clause 1, wherein directly fabricating tooth receiving cavities of an orthodontic device includes: directly fabricating an attachment receiving cavity in the at least one sidewall.

Clause 10. The method of clause 9, wherein directly fabricating the reinforcement member within the at least one sidewall includes: fabricating the reinforcement member proximate the attachment receiving cavity in the at least one sidewall.

Clause 11. The method of clause 10, wherein: the reinforcement member extends between a first end and a second end and includes an apex between the first end and the second end, the apex being more proximate the attachment receiving cavity than the first end and the second end.

Clause 12. The method of clause 1, wherein the reinforcement member is in a lingual sidewall of the at least one sidewall.

Clause 13. The method of clause 1, further comprising: directly fabricating an integral aligner hook or button on the at least one sidewall.

Clause 14. The method of clause 12, wherein the reinforcement member includes a first end in the at least on sidewall and a second end within the hook or button.

Clause 15. The method of clause 13, wherein the reinforcement member extends along a shaft of the button.

Clause 16. The method of clause 13, wherein the reinforcement member extends along a shaft of the hook.

Clause 17. The method of clause 13, wherein the second end of the reinforcement member is in a shaft of the button.

Clause 18. The method of clause 13, wherein the second end of the reinforcement member is in a head of the button.

Clause 19. The method of clause 1, wherein the orthodontic device is a template for placing a second orthodontic device of a tooth of the patient.

Clause 20. The method of clause 19, further comprising: directly fabricating a second orthodontic device with the first orthodontic device.

Clause 21. The method of clause 20, wherein: directly fabricating the second orthodontic device occurs at the same time as one or more of directly fabricating the tooth receiving cavies and directly fabricating the reinforcement member.

Clause 22. The method of clause 19, wherein the second orthodontic device is a power arm.

Clause 23. The method of clause 22, further comprising: directly fabricating an extension to couple the second orthodontic device with the first orthodontic device.

Clause 24. The method of clause 22, wherein: a first end of the extension coupled to the first orthodontic device is thinner than a second end of the extension coupled to the second orthodontic device.

Clause 25. A method of directly fabricating an orthodontic device, the method comprising: directly fabricating a body having a palatal portion having a surface shaped to match the shape of a patient's palate and extending between first tooth engagement structures shaped to engage teeth on a first side of a patient's arch and second tooth engagement structures shaped to engage teeth on a second side of a patient's arch; and directly fabricating a reinforcement structure within the palatal portion, wherein the reinforcement structure is fabricated of a second material, different than the first material.

Clause 26. The method of clause 25, wherein: directly fabricating the palatal portion occurs at the same time as directly fabricating the reinforcement structure.

Clause 27. The method of clause 26, wherein: the palatal portion includes a left palatal portion separate from a right palatal portion, and further comprising: directly fabricating a coupling that couples the left palatal portion to the right palatal portion.

Clause 28. The method of clause 27, wherein: the coupling is directly fabricated at the same time as the palatal portion.

Clause 29. The method of clause 27, wherein: the coupling includes a first internally threaded shaft formed in the left palatal portion and a second internally threaded shaft formed in the right palatal portion.

Clause 30. The method of clause 28, wherein: the coupling includes a threaded rod coupling the first internally threaded shaft with the second internally threaded shaft.

Clause 31. The method of clause 25, wherein: the first and second tooth engagement structures are tooth receiving cavities.

Clause 32. The method of clause 31, wherein: the reinforcement structure includes a plurality of fibers extending across the palatal portion.

Clause 33. The method of clause 32, wherein: a dimension of the fiber at a middle portion between the respective ends of the fiber is greater than a dimension of the respective ends of the fiber.

Clause 34. The method of clause 33, wherein the dimension is the of the fiber is a diameter.

Clause 35. The method of clause 32, wherein a diameter of a distal most of the plurality of fibers is greater than a diameter of a mesial fiber.

Clause 36. The method of clause 32, wherein a thickness of a distal most of the plurality of fibers is greater than a diameter of a mesial fiber.

Clause 37. The method of clause 25, wherein the reinforcement structure is a lattice structure.

Clause 38. The method of clause 37, wherein the lattice structure is a two-dimensional lattice structure.

Clause 39. The method of clause 38, wherein the two-dimensional lattice structure is formed of a plurality of a plurality of two-dimensional triangular lattice elements.

Clause 40. The method of clause 39, wherein the plurality of two-dimensional triangular lattice elements include three edges and three vertices.

Clause 41. The method of clause 39, wherein each edge of each of the plurality of two-dimensional triangular lattice elements is shared with an edge of an adjacent triangular lattice element.

Clause 42. The method of clause 37, wherein a density of the lattice structure varies in a mesial-distal direction.

Clause 43. The method of clause 42, wherein the density of the lattice structure is greater at a distal portion of the dental device than a mesial portion of the dental device.

Clause 44. The method of clause 37, wherein the lattice structure is a three-dimensional lattice structure.

Clause 45. The method of clause 44, wherein the two-dimensional lattice structure is formed of a plurality of a plurality of three-dimensional tetrahedron lattice elements.

Clause 46. The method of clause 45, wherein the plurality of three-dimensional tetrahedron lattice elements include four faces.

Clause 47. The method of clause 46, wherein each face of each of the plurality of three-dimensional tetrahedron lattice elements is shared with an face of an adjacent tetrahedron lattice element.

Clause 48. The method of clause 44, wherein a density of the lattice structure varies in a mesial-distal direction.

Clause 49. The method of clause 44, wherein the density of the lattice structure is greater at a distal portion of the dental device than a mesial portion of the dental device.

Clause 50. The method of clause 44, wherein the density of the lattice structure is greater at a palatal roof portion of the palatal device.

Clause 51. A system for dental care comprising: an orthodontic device including tooth receiving cavities having at least one sidewall and being fabricated of a first material; and a reinforcement member within the at least one sidewall, the reinforcement members being of a second material, different than the first material.

Clause 52. The system of clause 51, wherein the first material comprises a polymer.

Clause 53. The system of clause 52, wherein the second material comprises a metal.

Clause 54. The system of clause 51, wherein the reinforcement member extends from a first end to a second end along a mesial-distal direction of the orthodontic device.

Clause 55. The method of clause 54, wherein: the first end is within a sidewall of a first of the tooth receiving cavities and the second end is within a sidewall of a second tooth receiving cavity.

Clause 56. The system of clause 55, wherein: the first tooth receiving cavity and the second tooth receiving cavity are adjacent.

Clause 57. The system of clause 55, wherein: the first tooth receiving cavity and the second tooth receiving cavity are not adjacent.

Clause 58. The system of clause 51, further comprising: an attachment receiving cavity extending from the at least one sidewall.

Clause 59. The system of clause 58, wherein the reinforcement member is proximate the attachment receiving cavity in the at least one sidewall.

Clause 60. The system of clause 59, wherein: the reinforcement member extends between a first end and a second end and includes an apex between the first end and the second end, the apex being more proximate the attachment receiving cavity than the first end and the second end.

Clause 61. The system of clause 51, wherein the reinforcement member is in a lingual sidewall of the at least one sidewall.

Clause 62. The system of clause 51, further comprising: an integral aligner hook or button on the at least one sidewall.

Clause 63. The system of clause 61, wherein the reinforcement member includes a first end in the at least on sidewall and a second end within the hook or button.

Clause 64. The system of clause 63, wherein the reinforcement member extends along a shaft of the button.

Clause 65. The system of clause 63, wherein the reinforcement member extends along a shaft of the hook.

Clause 66. The system of clause 63, wherein the second end of the reinforcement member is in a shaft of the button.

Clause 67. The system of clause 63, wherein the second end of the reinforcement member is in a head of the button.

Clause 68. A system for dental care comprising: a body having a palatal portion having a surface shaped to match the shape of a patient's palate and extending between first tooth engagement structures shaped to engage teeth on a first side of a patient's arch and second tooth engagement structures shaped to engage teeth on a second side of a patient's arch; and a reinforcement structure within the palatal portion, wherein the reinforcement structure is fabricated of a second material, different than the first material and a dimension of the fiber at a middle portion between respective ends of the fiber is greater than a dimension of the respective ends of the fiber.

Clause 69. The system of clause 68, wherein: the first and second tooth engagement structures are tooth receiving cavities.

Clause 70. The system of clause 69, wherein: the reinforcement structure includes a plurality of fibers extending across the palatal portion.

Clause 71. The system of clause 70, wherein the dimension is the of the fiber is a diameter.

Clause 72. The system of clause 70, wherein a diameter of a distal most of the plurality of fibers is greater than a diameter of a mesial fiber.

Clause 73. The system of clause 70, wherein a thickness of a distal most of the plurality of fibers is greater than a diameter of a mesial fiber.

Clause 74. The system of clause 68, wherein the reinforcement structure is a lattice structure.

Clause 75. The system of clause 74, wherein the lattice structure is a two-dimensional lattice structure.

Clause 76. The system of clause 75, wherein the two-dimensional lattice structure is formed of a plurality of a plurality of two-dimensional triangular lattice elements.

Clause 77. The system of clause 76, wherein the plurality of two-dimensional triangular lattice elements include three edges and three vertices.

Clause 78. The system of clause 76, wherein each edge of each of the plurality of two-dimensional triangular lattice elements is shared with an edge of an adjacent triangular lattice element.

Clause 79. The system of clause 74, wherein a density of the lattice structure varies in a mesial-distal direction.

Clause 80. The system of clause 79, wherein the density of the lattice structure is greater at a distal portion of the dental device than a mesial portion of the dental device.

Clause 81. The system of clause 74, wherein the lattice structure is a three-dimensional lattice structure.

Clause 82. The system of clause 81, wherein the two-dimensional lattice structure is formed of a plurality of a plurality of three-dimensional tetrahedron lattice elements.

Clause 83. The system of clause 82, wherein the plurality of three-dimensional tetrahedron lattice elements include four faces.

Clause 84. The system of clause 83, wherein each face of each of the plurality of three-dimensional tetrahedron lattice elements is shared with an face of an adjacent tetrahedron lattice element.

Clause 85. The system of clause 81, wherein a density of the lattice structure varies in a mesial-distal direction.

Clause 86. The system of clause 81, wherein the density of the lattice structure is greater at a distal portion of the dental device than a mesial portion of the dental device.

Clause 87. The system of clause 81, wherein the density of the lattice structure is greater at a palatal roof portion of the palatal device.

Embodiments of the present disclosure have been shown and described as set forth herein and are provided by way of example only. One of ordinary skill in the art will recognize numerous adaptations, changes, variations and substitutions without departing from the scope of the present disclosure. Several alternatives and combinations of the embodiments disclosed herein may be utilized without departing from the scope of the present disclosure and the inventions disclosed herein. Therefore, the scope of the presently disclosed inventions shall be defined solely by the scope of the appended claims and the equivalents thereof.

What is claimed is:

1. A method of directly fabricating an orthodontic device, the method comprising: directly fabricating polymer tooth receiving cavities of an orthodontic device for a first arch of a patient, the tooth receiving cavities including at least one sidewall and being fabricated of a first polymer material, and a first tooth receiving cavity of the tooth receiving cavities having an attachment receiving well shaped to receive an attachment located on a tooth of the first arch of the patient; and directly fabricating a metal reinforcement member proximate the attachment receiving cavity in the at least one sidewall, the metal reinforcement member extending between a first end and a second end within the at least one sidewall, the metal reinforcement member extending between the first end and the second end with an apex being located between the first end and the second end, the apex being more proximate the attachment receiving cavity in a mesial-distal direction than the first end and the second end wherein the first end of the metal reinforcement member located within a sidewall of a first tooth receiving cavity of the tooth receiving cavities and the second end of the metal reinforcement member located within the sidewall of the first tooth receiving cavity of the tooth receiving cavities, wherein the metal reinforcement member comprises a metal fiber fabricated of a metal, different than the first polymer material.

2. The method of claim 1, wherein:

directly fabricating the tooth receiving cavities occurs at the same time as directly fabricating the metal reinforcement member.

3. The method of claim 1, wherein directly fabricating the metal reinforcement member within the at least one sidewall includes:

fabricating the metal reinforcement member to extend from the first end to second end along a occlusal-gingival direction of the orthodontic device.

4. The method of claim 1, further comprising:

a second metal reinforcement member, the second metal reinforcement member extending from a first end within the first tooth receiving cavity to a second end in a second tooth receiving cavity, the first tooth receiving cavity and the second tooth receiving cavity are adjacent.

5. The method of claim 1, further comprising:

a second metal reinforcement member, the second metal reinforcement member extending from a first end within the first tooth receiving cavity to a second end in a second tooth receiving cavity, the first tooth receiving cavity and the second tooth receiving cavity are not adjacent.

6. The method of claim 1, wherein the metal reinforcement member is in a lingual sidewall of the at least one sidewall.

7. The method of claim 1, further comprising:

directly fabricating an integral aligner hook or button on the at least one sidewall.

8. The method of claim 7, further comprising a second metal reinforcement member wherein the second metal reinforcement member includes a first end in the at least one sidewall and a second end within the hook or button.

9. The method of claim 8, wherein the second metal reinforcement member extends along a shaft of the button.

10. The method of claim 8, wherein the second metal reinforcement member extends along a shaft of the hook.

11. The method of claim 8, wherein the second end of the second metal reinforcement member is in a shaft of the button.

12. The method of claim 8, wherein the second end of the second metal reinforcement member is in a head of the button.

* * * * *